United States Patent
Patel et al.

(10) Patent No.: US 10,841,023 B2
(45) Date of Patent: Nov. 17, 2020

(54) 5G FIXED WIRELESS ACCESS DEVICE SELF-INSTALLATION

(71) Applicant: Verizon Patent and Licensing Inc., Arlington, VA (US)

(72) Inventors: Samirkumar Patel, Middlesex, NJ (US); Xin Wang, Morris Plains, NJ (US); Paul R. Mcdonough, Marlboro, NJ (US); Andrew E. Youtz, Princeton, NJ (US); Lily Zhu, Parsippany, NJ (US); Arda Aksu, Lafayette, CA (US); Balaji L. Raghavachari, Bridgewater, NJ (US); Siegfried Erhard Eichinger, West Chester, PA (US); Christopher M. Schmidt, Branchburg, NJ (US); Jignesh S. Panchal, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/774,738

(22) Filed: Jan. 28, 2020

(65) Prior Publication Data
US 2020/0169339 A1   May 28, 2020

Related U.S. Application Data

(63) Continuation of application No. 16/121,934, filed on Sep. 5, 2018, now Pat. No. 10,560,204.

(51) Int. Cl.
*H04B 3/46*   (2015.01)
*H04B 17/318*   (2015.01)
*H04W 64/00*   (2009.01)
*H04W 16/20*   (2009.01)
*H04L 23/00*   (2006.01)
(Continued)

(52) U.S. Cl.
CPC .......... *H04B 17/318* (2015.01); *H04W 16/20* (2013.01); *H04W 64/003* (2013.01); *H04W 24/10* (2013.01); *H04W 84/045* (2013.01)

(58) Field of Classification Search
CPC .. H04B 17/318; H04W 16/20; H04W 64/003; H04W 24/10; H04W 84/045
See application file for complete search history.

(56) References Cited

U.S. PATENT DOCUMENTS 10,608,729 B1 * 3/2020 Youtz ................. H04B 7/0486
2017/0064618 A1   3/2017 Katar et al.
(Continued)

OTHER PUBLICATIONS

Parsaeefard, et al., "User Association in Cloud RANs with Massive MIMO", IEEE Transaction on Cloud Computing, 2018, pp. 1-16.

*Primary Examiner* — Tesfaldet Bocure

(57) ABSTRACT

The present disclosure provides a method comprising attaching, by a fixed wireless access device, to a Fourth Generation (4G) Long Term Evolution (LTE) base station, causing, by the fixed wireless access device, the 4G LTE base station to add a Fifth Generation (5G) New Radio (NR) base station as a secondary base station for the fixed wireless access device, scanning, by the fixed wireless access device, for 5G wireless signals associated with the 5G NR base station and generating, by the fixed wireless access device, an indication of signal strength for the 5G wireless signals associated with the 5G NR base station.

20 Claims, 13 Drawing Sheets

(51) Int. Cl.
*H04L 7/00* (2006.01)
*H04W 24/10* (2009.01)
*H04W 84/04* (2009.01)

(56) References Cited

U.S. PATENT DOCUMENTS

| | | |
|---|---|---|
| 2018/0199331 A1 | 7/2018 | Wang et al. |
| 2018/0324742 A1 | 11/2018 | Agarwal et al. |
| 2019/0069205 A1 | 2/2019 | Lee et al. |
| 2019/0069229 A1 | 2/2019 | Lee et al. |
| 2019/0110319 A1 | 4/2019 | Tokgoz et al. |
| 2019/0268962 A1* | 8/2019 | Wang .................. H04B 17/318 |

* cited by examiner

5G FIXED WIRELESS ACCESS DEVICE SELF-INSTALLATION

CROSS REFERENCE TO RELATED APPLICATIONS

This patent application is a continuation of U.S. patent application Ser. No. 16/121,934, filed on Sep. 5, 2018, and now issued as U.S. Pat. No. 10,560,204 on Feb. 11, 2020, the contents of which are hereby incorporated by reference in their entirety.

BACKGROUND INFORMATION

Wireless communication services continue to improve and expand available services as well as networks used to deliver such services. One aspect of such improvements includes the development of wireless access networks as well as options to utilize such wireless access networks. Network providers may manage a large number of wireless access networks and a particular wireless access network may manage a large number of devices. In order to maintain a quality of service across a network, or across multiple networks, network providers may need to manage different radio technology types.

DETAILED DESCRIPTION OF PREFERRED EMBODIMENTS

Figure 1:
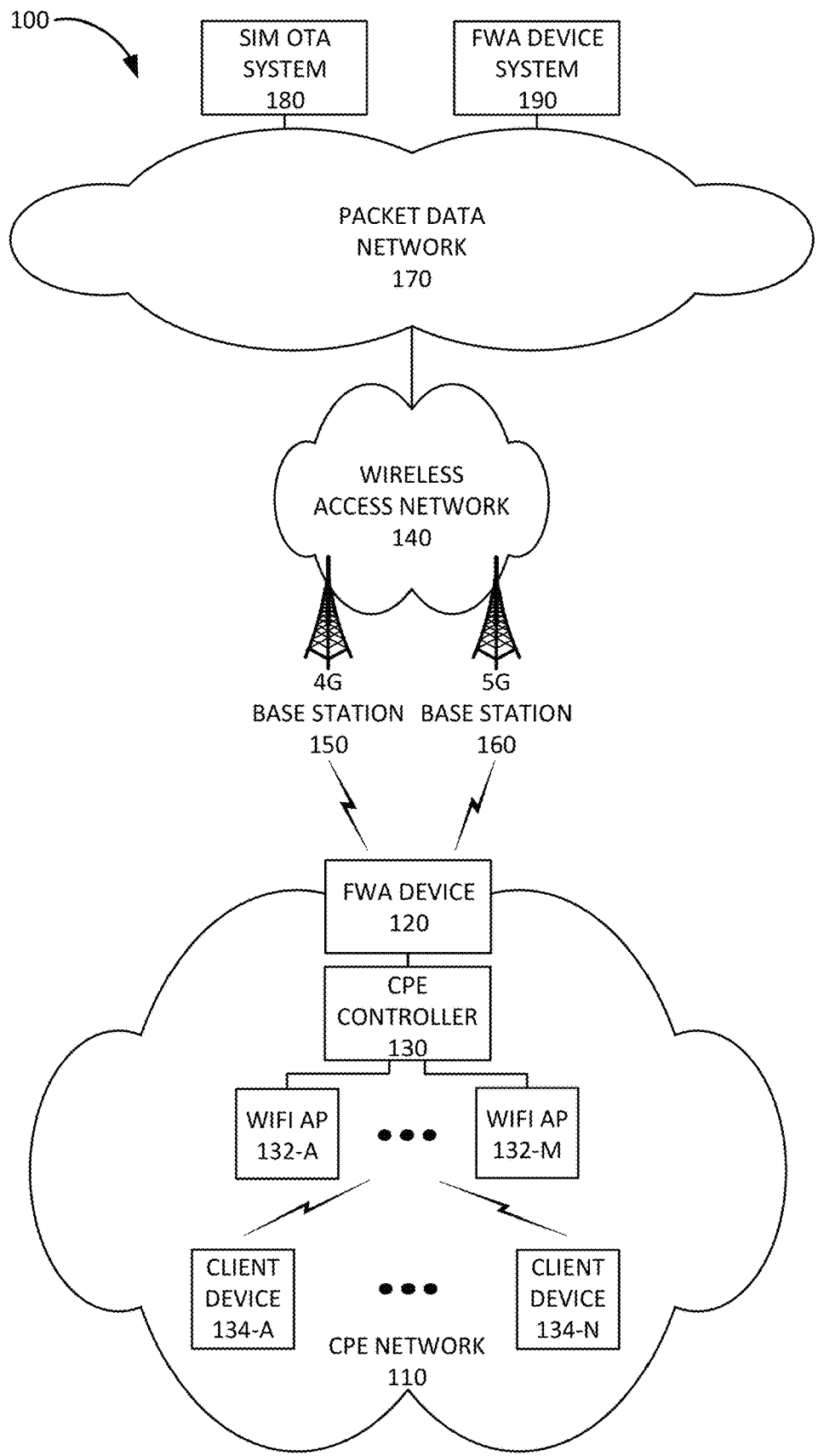
FIG. 1 is a diagram illustrating an environment according to an implementation described herein.

The following detailed description refers to the accompanying drawings. The same reference numbers in different drawings identify the same or similar elements.

As communication networks and services increase in size, complexity, and number of users, management of the communication networks may become increasingly more complicated. One way in which wireless access networks are continuing to become more complicated is by incorporating various aspects of next generation networks, like Fifth Generation (5G) mobile networks, as defined by the $3^{rd}$ Generation Partnership Project (3GPP). These aspects may include, for example, high frequency bands and a large number of antennas. 5G mm-wave air interface technology, referred to as 5G New Radio (NR) radio access technology (RAT), may provide significant improvements in bandwidth and/or latency over other wireless network technologies. Furthermore, coverage and signal quality may be improved using multiple-input and multiple-output (MIMO) adaptive antenna arrays. Additionally, user equipment (UE) devices may also include multiple antennas to improve spectral efficiency.

The 5G NR mm-wave air interface may include a high bandwidth that provides high data throughput in comparison to the data throughput of a Fourth Generation (4G) Long Term Evolution (LTE) air interface. However, because of the high mm-wave frequencies, the 5G NR air interface may be susceptible to intermittent signal quality degradation due to multipath wave propagation and fading, as a result of scattering from terrain objects, such as buildings, foliage, mountains, vehicles, etc.; reflection from bodies of water; ionospheric reflection and/or refraction; atmospheric attenuation and scattering; and/or other types of signal interference. Such variations in signal quality may be particularly important in areas with a low density of 5G coverage, such as during the initial deployment of 5G base stations.

5G NR coverage may initially be deployed as islands relative to existing air interface coverage. Thus, areas with 5G NR coverage may also provide existing 4G LTE coverage, and UE devices enabled to communicate using 5G NR may be able to attach to both a 4G base station and a 5G base station. A UE device may be simultaneously attached to a master cell group (MCG), also known as a master eNodeB, and a secondary cell group (SCG), also known as a secondary eNodeB. If 5G NR coverage is available, the SCG may correspond to a 5G NR base station, referred to as a gNodeB. Dual coverage using 4G and 5G networks may be referred to as Non-Standalone (NSA) architecture.

The NSA architecture may include an interoperability option referred to as Option 3x. Option 3x may include a split bearer option in which a gNodeB splits user plane traffic when the 5G NR air interface is not available (e.g., signal quality of the 5G NR air interface is below a signal quality threshold, the capacity of the 5G NR air interface is below a capacity threshold, etc.). Thus, when the 5G NR link is available, downlink data may be sent to the UE device via the gNodeB. When the 5G NR link is not available, downlink data may be sent by the 5G base station to the eNodeB and the eNodeB may send the downlink data to the UE device via the 4G LTE air interface. Therefore, gNodeB may switch back and forth between sending the data via the 5G air interface and the 4G LTE air interface. Additionally, Option 3× may enable simultaneous data transfer over a 5G NR air interface and a 4G LTE air interface.

In order to take advantage of the high bandwidths available via the 5G NR air interface, a provider of communication services may deploy fixed wireless access (FWA) devices to provide telecommunication services, such as Internet service that includes Voice over Internet Protocol (VoIP), video streaming, live gaming, Internet browsing, etc. Thus, instead of a wired electrical connection (e.g., a coaxial cable connection, etc.) or an optical connection (e.g., an optical network terminal (ONT) connected to an optical fiber, etc.), an FWA device may connect a customer to a network through one or more base stations via wireless signals. The FWA device may function as a UE device with respect to the one or more base stations.

An FWA device may be installed in a fixed location at the customer premises associated with a customer, such as a residential house, an apartment building, an office building, etc. In order to install and configure Internet service for a customer, a provider may need to dispatch a technician to the customer premises to install and configure a network device. However, dispatching a technician is costly to the provider and inconvenient to the customer. Therefore, if a customer is able to install an FWA device without a technician, the provider may save money and the customer may be able to install the FWA device at the customer's convenience.

As the signal strength of 5G NR wireless signals may vary significantly at different locations in a customer premises location, the customer may need to identify a good location, inside or outside a building (e.g., a house, apartment, office building, etc.) at which to install the FWA device for good 5G NR wireless signal coverage. In order to identify a good location, the customer may need to determine the signal strength of 5G NR wireless signals as the customer places the FWA device in various locations around the customer premises.

However, in the NSA architecture, a UE device may not always connect to a gNodeB on its own and may need to wait for the network to configure a 5G NR connection after the UE device attaches to a master 4G LTE base station. Moreover, the 3GPP standard for 5G does not include an operator identifier (ID) (e.g., a Public Land Mobile Network (PLMN) ID, etc.) to be broadcast or require that a system information block (SIB) be broadcast in an NSA option 3× implementation. Therefore, an FWA device may not be able to identify 5G NR wireless signals from the gNodeB associated with the provider during installation.

Implementations described herein relate to 5G FWA device self-installation by enabling an FWA device to scan for 5G signals and to provide, to a customer, an indication of the signal strength of a 5G signal during installation. The FWA device may be configured to activate a 5G scanning mode and scan for 5G wireless signals associated with a provider that is also associated with the fixed wireless access device. The FWA device may be further configured to detect a 5G wireless signal associated with the provider; determine strength for the detected 5G wireless signal; and generate an indication of the determined signal strength to be displayed in a user interface associated with the fixed wireless access device.

In some implementations, the gNodeB may be configured to broadcast a SIB that includes one or more operator IDs, such as a PLMN ID. Thus, the FWA device may be configured to determine a 5G operator ID associated with the provider and scan for 5G wireless signals that include the determined 5G operator identifier. Configuring the gNodeB to broadcast an operator ID may not require an active connection or data transfer between the FWA device and the network.

In some implementations, configuring a gNodeB to transmit an operator ID may not be possible or desired. Furthermore, broadcasting a SIB, which may require higher level channels, such as a logical channel and/or transport channel, may consume network resources. Therefore, in some implementations, a gNodeB may not be broadcasting a SIB when a user initiates a scan for 5G signals in connection with the installation of an FWA device. Rather, the FWA device may be configured to obtain information identifying a 5G synchronization signal, such as, for example, a 5G NR Synchronization Signal Block (SSB). In a 5G NR NSA implementation, an SSB may be broadcast using different bands and/or channels and may include various timing and spacing configurations. Thus, the FWA device may need to obtain information on how to locate and identify the 5G synchronization signal.

In some implementations, information identifying parameters associated with the SSB may be stored on the FWA device and/or on a Subscriber Identity Module (SIM) card included in the FWA device. In other implementations, the FWA device may obtain information identifying a frequency at which a 5G synchronization signal is broadcast, and/or other 5G synchronization signal parameters, and may scan for the 5G synchronization signal at the identified frequency and/or using the other 5G synchronization signal parameters, such as the timing and/or spacing of the 5G synchronization signal. As an example, the FWA device may obtain the 5G synchronization signal parameters after attaching to a 4G LTE base station, via a SIM Over-the-air (OTA) system during a SIM update, via a server device communicating with an application installed on a smart phone (or another type of client device) connected to the FWA device, and/or using another technique.

In other implementations, the FWA device may be configured to attach to a 4G LTE base station; cause the 4G LTE base station to add a 5G NR base station as a secondary node base station for the fixed wireless access device; and scan for 5G wireless signals associated with the 5G NR base station.

In some implementations, the FWA device may be configured to cause the 4G LTE base station to add the 5G NR base station as a secondary node by transmitting an FWA ID in an attach request. For example, the FWA device may be configured to send an attach request to a 4G LTE base station with an FWA ID included in the attach request. The FWA ID may be recognized by the wireless access network, and, in response, the wireless access network may trigger the 4G LTE base station to add a 5G NR base station as a secondary node to the 4G LTE base station. The FWA device may then receive, from the 4G LTE base station, a reconfiguration message that indicates to the FWA device that the 5G secondary node has been added and that includes information identifying a synchronization signal associated with the added 5G secondary node. The FWA device may then measure and report the 5G signal strength based on the indicated frequency of the SSB signal.

In other implementations, the FWA device may be identified using other techniques. As example, rather than sending a FWA ID in an attach request, the wireless access network may identify the FWA device as an FWA device type based on another type of ID associated with the FWA device, such as, for example, a Service Profile ID (SPID), an International Mobile Equipment Identity (IMEI), International Mobile Subscriber Identity (IMSI), and/or another type of device ID or subscription type. The device ID may be associated with a FWA device type during provisioning and stored in a subscriber profile associated with the FWA device. As another example, the wireless access network may identify the FWA device as an FWA device type based on how the FWA device select to connect to the wireless access network, such as by the FWA device requesting to access a particular Access Point Name (APN), requesting a bearer with a particular Allocation and Retention Priority (ARP) and/or Quality of Service Class ID (QCI), and/or another type of request for a particular type of connection. As yet another example, the FWA device may inform the wireless access network of its FWA device type status during a UE capability transfer procedure.

In yet other implementations, the FWA device may be configured to cause the 4G LTE base station to add the 5G NR base station as a secondary node by requesting a high data rate traffic connection. For example, the FWA device may be configured to attach to a 4G LTE base station and request high data rate traffic via a connection with the 4G LTE base station. The high data rate traffic may trigger the 4G LTE base station to add a 5G NR base station as a secondary node. The FWA device may then receive, from the 4G LTE base station, a reconfiguration message that indicates to the FWA device that the 5G secondary node has been added and that includes information identifying a synchronization signal associated with the added 5G secondary node. The FWA device may then measure and report the 5G signal strength based on the indicated frequency of the SSB signal.

In yet other implementations, the FWA device may not cause the 4G LTE base station to add the 5G NR base station as a secondary node by transmitting an FWA ID in an attach request. Rather, the FWA ID, and/or other technique of detecting a FWA device type, may cause the 4G LTE base station to instruct the FWA device to perform a 5G signal strength measurement. For example, the 4G LTE base station may instruct the FWA device to perform a B1 event measurement using a measurement object specified in a reconfiguration message. A B1 event corresponds to an inter RAT neighbor becoming better than a threshold. Thus, the B1 event measurement causes the FWA device to measure the 5G signal strength to determine whether the 5G signal strength is high enough to trigger a measurement report. The measurement object in the reconfiguration message may specify one or more parameters of a 5G synchronization signal, such as a carrier frequency, subcarrier spacing, timing configuration, and/or other types of parameters, which enable the FWA device to identify, and determine the strength of, the 5G synchronization signal. In yet other implementations, the 4G LTE base station may instruct the FWA device to perform the 5G signal strength measurement without first detecting the FWA device as a FWA device type. Rather, the 4G LTE base station may instruct all UE devices to perform a 5G signal strength measurement.

In some implementations, generating the indication of the determined signal strength may include displaying the indication of the determined signal strength on an output device included on the fixed wireless access device. In other implementations, generating the indication of the determined signal strength may include sending the indication of the determined signal strength to a client device configured to communicate with the fixed wireless access device, to be displayed by the client device.

In some implementations, the FWA device may be further configured to keep track of the signal strength for the detected 5G wireless signal over a time period and generate an indication of how the signal strength for the detected 5G wireless signal varies over the time period, to be displayed in the user interface associated with the fixed wireless access device. Additionally, in some implementations, the FWA device may be further configured to keep track of the signal strength for the detected 5G wireless signal at different installed locations for the fixed wireless access device and generate an indication of how the signal strength for the detected 5G wireless signal varies over the different installed locations, to be displayed in the user interface associated with the fixed wireless access device.

FIG. 1 is a diagram of an exemplary environment 100 in which the systems and/or methods, described herein, may be implemented. As shown in FIG. 1, environment 100 may include a customer premises equipment (CPE) network 110, a wireless access network 140, a packet data network 170, a SIM OTA system 180, and an FWA device system 190.

CPE network 110 may include a Layer 2 and/or Layer 3 local area network (LAN) associated with a customer's premises. For example, CPE network 110 may be located at or within a residential home, in an apartment building, in a school, in a commercial office building, in a shopping mall, in a connected mass transit vehicle (e.g., bus, train, plane, boat, etc.), and/or in another type of location associated with a customer of a provider of telecommunication services. CPE network 110 may receive one or more services via a wireless connection between FWA device 120 and packet data network 170, such as, for example, a television service, Internet service, and/or voice communication (e.g., telephone) service. CPE network 110 may be implemented as a gigabit network that enables gigabit speed connections. CPE network 110 may include FWA device 120, a CPE controller 130, WiFi APs 132-A to 132-M (referred to herein collectively as "WiFi APs 132" and individually as "WiFi AP 132"), and client devices 134-A to 134-M (referred to herein collectively as "client devices 134" and individually as "client device 134").

FWA device 120 may be installed in a particular location at, or near, the customer premises, such as outside a building (e.g., on a roof, attached to an outside wall, et.) or inside a building (e.g., next to a window or at another location associated with good wireless signal reception). FWA device 120 may be configured to attach to, and communicate with, wireless access network 140. FWA device 120 may be configured to communicate via both a 4G LTE air interface and a 5G NR air interface. FWA device 120 may be configured to detect 5G wireless signals associated with a provider and to generate an indication of signal strength for the detected 5G wireless signals on a user interface associated with FWA device 120.

CPE controller 130 may include a network device configured to function as a switch and/or router for devices in CPE network 110. CPE controller 130 may connect devices in CPE network 110 to FWA device 120. CPE controller 130 may include a layer 2 and/or layer 3 network device, such as a switch, router, firewall, and/or gateway and may support different types of interfaces, such as an Ethernet interface, a WiFi interface, a Multimedia over Coaxial Alliance (MoCA) interface, and/or other types of interfaces. CPE controller 130 may further manage WiFi APs 132 and/or client devices 134 connected to WiFi APs 132.

WiFi AP 132 may include a transceiver configured to communicate with client devices 134 using WiFi signals based on the Institute of Electrical and Electronics Engineers (IEEE) 802.11 standards for implementing a wireless LAN network. WiFi AP 132 may enable client devices 134 to communicate with each other and/or with FWA device 120 via CPE controller 130. WiFi AP 132 may be connected to CPE controller 130 via a wired connection (e.g., an Ethernet cable). Furthermore, WiFi APs 132 may include one or more Ethernet ports for connecting client devices 134 via a wired Ethernet connection. In some implementations, FWA device 120 may include, and/or perform the functions of, CPE controller 130 and/or WiFi AP 132.

Client device 134 may include any computer device that connects to a particular WiFi AP 132 using WiFi wireless signals. For example, client device 134 may include a handheld wireless communication device (e.g., a mobile phone, a smart phone, a phablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a desktop computer; a set-top box or a digital media player (e.g., Apple TV, Google Chromecast, Amazon Fire TV, etc.); a smart television; a portable gaming system; a home appliance device; a home monitoring device; and/or any other type of computer device with wireless communication capabilities. Client device 134 may be used for voice communication, mobile broadband services (e.g., video streaming, real-time gaming, premium Internet access etc.), best effort data traffic, and/or other types of applications.

As another example, client device 134 may correspond to an embedded wireless device that communicates wirelessly with other devices over an M2M interface using MTC and/or another type of M2M communication. As an example, client device 134 may be electrically connected or coupled to a sensor device, an actuator device, a microcontroller controlling one or more sensors, a microcontroller controlling one or more actuators, a microcontroller that performs data processing, and/or another type of MTC device. Examples of such devices may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), and/or another type of electronic device.

Wireless access network 140 may provide access to packet data network 170 for wireless devices, such as FWA device 120. Wireless access network 140 may enable FWA device 120 to connect to packet data network 170 for mobile telephone service, Short Message Service (SMS) message service, Multimedia Message Service (MMS) message service, Internet access, cloud computing, and/or other types of data services.

Wireless access network 140 may establish or may be incorporated into a packet data network connection between FWA device 120 and packet data network 170 via one or more Access Point Names (APNs). For example, wireless access network 140 may establish an Internet Protocol (IP) connection between FWA device 120 and packet data network 170. Furthermore, wireless access network 140 may enable FWA device 120 to communicate with an application server, and/or another type of device, located in packet data network 170 using a communication method that does not require the establishment of an IP connection between FWA device 120 and packet data network 170, such as, for example, Data over Non-Access Stratum (DoNAS).

In some implementations, wireless access network 140 may include a Long Term Evolution (LTE) access network (e.g., an evolved packet core (EPC) network). In other implementations, wireless access network 140 may include a Code Division Multiple Access (CDMA) access network. For example, the CDMA access network may include a CDMA enhanced High Rate Packet Data (eHRPD) network (which may provide access to an LTE access network).

Furthermore, wireless access network 140 may include an LTE Advanced (LTE-A) access network and/or a 5G access network or other advanced network that includes functionality such as carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

As described herein, wireless access network 140 may include a 4G base station 150 (e.g., an eNodeB) and a 5G base station 160 (e.g., a gNodeB). 4G base station 150 and 5G base station 160 may each include one or more cells that include devices and/or components configured to enable wireless communication with FWA devices 120. For example, each cell may include a radio frequency (RF) transceiver facing a particular direction. 4G base station 150 may be configured to communicate with FWA device 120 using a 4G LTE air interface. 5G base station 160 may be configured to communicate with FWA device 120 using a 5G NR air interface. For example, 5G base station 160 may include one or more antenna arrays configured to send and receive wireless signals in the mm-wave frequency range.

Packet data network 170 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of packet data network 170 may be managed by a provider of communication services that also manages wireless access network 140 and/or FWA device 120. Packet data network 170 may allow the delivery of Internet Protocol (IP) services to FWA device 120, and may interface with other external networks. Packet data network 170 may include one or more server devices and/or network devices, or other types of computation or communication devices. In some implementations, Packet data network 170 may include an IP Multimedia Sub-system (IMS) network (not shown in FIG. 1). An IMS network may include a network for delivering IP multimedia services and may provide media flows between FWA device 120 and external IP networks or external circuit-switched networks (not shown in FIG. 1).

SIM OTA system 180 may include one or more devices, such as computer devices and/or server devices, which manage SIM cards for UE devices, such as FWA device 120. For example, SIM OTA system 180 may provide SIM updates to the SIM card included in FWA device 120. Furthermore, SIM OTA system 180 may include information relating to 5G signals in a SIM update sent to FWA device 120. For example, SIM OTA system 180 may obtain information relating to the parameters of a 5G synchronization signal from FWA device system 190 and include the obtained information in the SIM update to FWA device 120.

FWA device system 190 may include one or more devices, such as computer devices and/or server devices, which manage various aspects of the functionality of FWA device 120. For example, FWA device system 190 may maintain a database of parameters relating to 5G synchronization signals for 5G base stations 160 associated with a provider. For example, for each particular 5G base station 160, FWA device system 190 may store information relating to the location of the particular 5G base station 160 and/or the geographical area serviced by the particular 5G base station 160, information relating to an operator ID associated with the particular 5G base station 160, information relating to one or more parameters relating to 5G a 5G synchronization signal that is broadcast by the particular 5G base station 160, and/or other types of information associated with the particular 5G base station 160.

Furthermore, FWA device system 190 may manage an FWA device application associated with FWA device 120. For example, FWA device system 190 may provide the FWA device application to client device 134, such as a customer's smart phone, and may communicate with client device 134 via the FWA device application. For example, FWA device system 190 may provide information relating to one or more parameters of a 5G synchronization signal to client device 134 and client device 134 may forward the information to FWA device 120.

Although FIG. 1 shows exemplary components of environment 100, in other implementations, environment 100 may include fewer components, different components, differently arranged components, or additional functional components than depicted in FIG. 1. Additionally, or alternatively, one or more components of environment 100 may perform functions described as being performed by one or more other components of environment 100.

Figure 2:
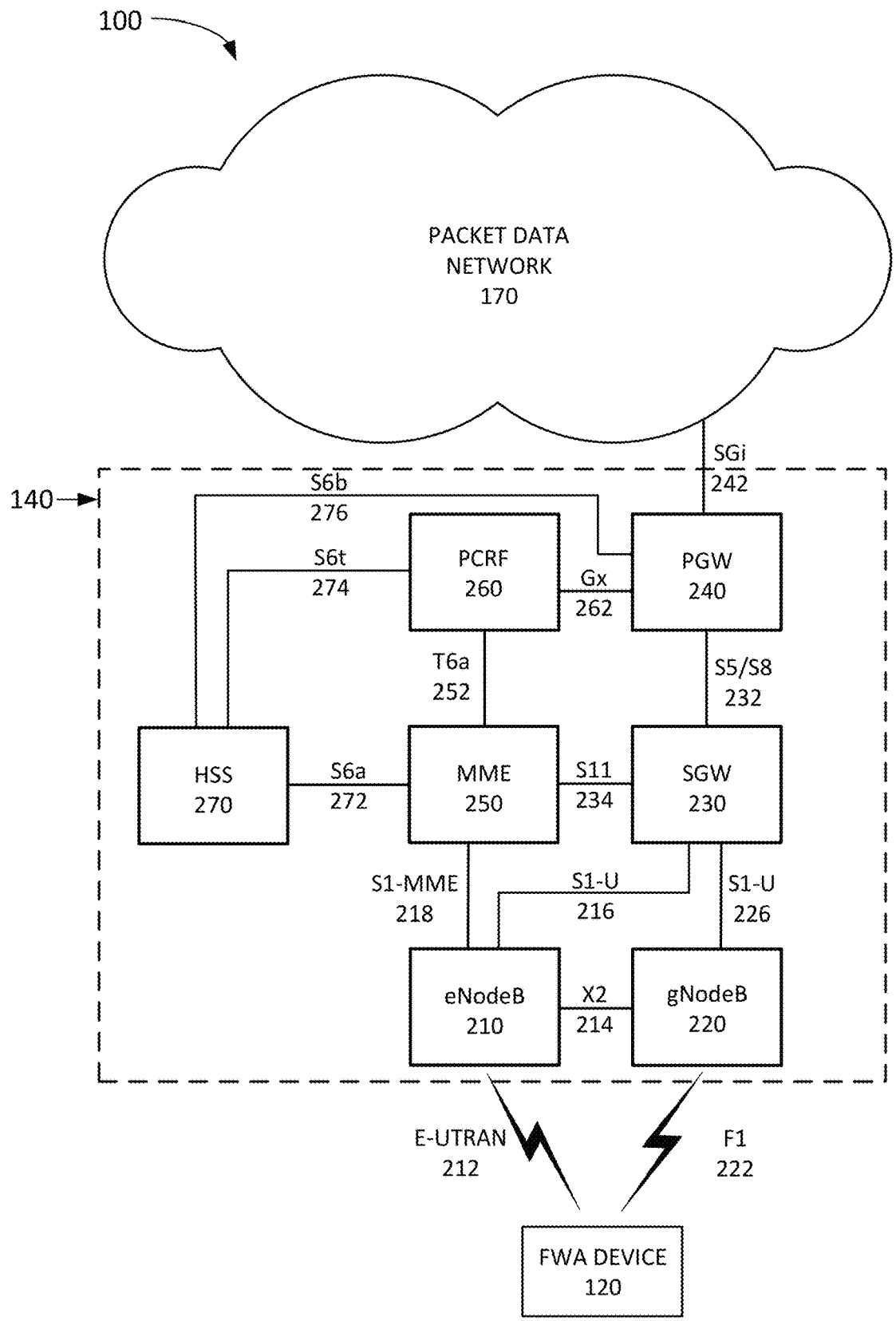
FIG. 2 is a diagram illustrating exemplary components of the wireless access network of FIG. 1.

FIG. 2 is a diagram illustrating exemplary components of wireless access network 140 in the context of environment 100 according to an implementation described herein. As shown in FIG. 2, wireless access network 140 may include eNodeB 210, gNodeB 220, a Serving Gateway (SGW) 230, a Packet Data Network (PDN) Gateway (PGW) 240, a Mobility Management Entity (MME) 250, a Policy and Charging Rules Function (PCRF) device 260, and Home Subscriber Server (HSS) 270. While FIG. 2 depicts a single eNodeB 210, a single gNodeB 220, a single SGW 230, a single PGW 240, a single MME 250, a single PCRF device 260, and a single HSS 270, for illustration purposes, in practice, wireless access network 140 may include multiple eNodeBs 210, multiple gNodeB 220, multiple SGW 230, multiple PGW 240, multiple MME 250, multiple PCRF device 260, and/or multiple HSS 270.

eNodeB 210 may correspond to 4G base station 130. eNodeB 210 may communicate with FWA device 120 using a 4G LTE air interface referred to as an Evolved Universal Mobile Telecommunications System (UMTS) Terrestrial Radio Access Network (E-UTRA) interface 212. eNodeB 210 may interface with wireless access network 140 via an interface referred to as an S1 interface, which may include both a control plane S1-MME interface 218 and a data plane S1-U interface 216. S1-MME interface 218 may interface with MME 250. S1-MME interface 218 may be implemented, for example, with a protocol stack that includes a Non-Access Stratum (NAS) protocol and/or Stream Control Transmission Protocol (SCTP). An S1-U interface 216 may interface with SGW 230 and may be implemented, for example, using General Packet Radio Service (GPRS) Tunneling Protocol version 2 (GTPv2).

gNodeB 220 may correspond to 5G base station 140. gNodeB 220 may communicate with FWA device 120 using a 5G NR air interface referred to as an F1 interface 222. gNodeB 220 may communicate with SGW 230 using an S1-U interface 226. gNodeB 220 may communicate with eNodeB 210 using an X2 interface 214. For example, when gNodeB 220 determines that F1 interface 222 is not available, gNodeB 220 may forward downlink data to FWA device 120 via eNodeB 210 using X2 interface 214.

SGW 230 may provide an access point to and from FWA device 120, may handle forwarding of data packets for FWA device 120, and may act as a local anchor point during handover procedures between eNodeBs 210 and/or gNodeB 220. SGW 230 may interface with PGW 240 through an S5/S8 interface 232. S5/S8 interface 232 may be implemented, for example, using GTPv2. PGW 240 may function as a gateway to packet data network 170 through an SGi interface 242. A particular FWA device 120, while connected to a single SGW 230, may be connected to multiple PGWs 240, one for each packet network with which FWA device 120 communicates. For example, a particular PGW 240 may be associated with a particular APN and FWA device 120 may connect to the particular APN by connecting to the PGW 240 associated with the particular APN. Thus, FWA device 120 may be connected to one or more APNs at a particular time.

MME 250 may implement control plane processing for wireless access network 140. For example, MME 250 may implement tracking and paging procedures for FWA device 120, may activate and deactivate bearers for FWA device 120, may authenticate a user of FWA device 120, and may interface to non-LTE radio access networks. A bearer may represent a logical channel with particular quality of service (QoS) requirements. MME 250 may also select a particular SGW 230 for a particular FWA device 120. A particular MME 250 may interface with other MMES 250 in wireless access network 130 (not shown in FIG. 2) and may send and receive information associated with FWA devices 120, which may allow one MME 250 to take over control plane processing of FWA devices 120 serviced by another MME 250, if the other MME 250 becomes unavailable. Furthermore, MME 250 may manage non-IP communication with FWA device 120 using NAS.

MME 250 may communicate with SGW 230 through an S11 interface 234. S11 interface 234 may be implemented, for example, using GTPv2. S11 interface 234 may be used to create and manage a new session for a particular FWA device 120. S11 interface 234 may be activated when MME 250 needs to communicate with SGW 230, such as when the particular FWA device 120 attaches to wireless access network 130, when bearers need to be added or modified for an existing session for the particular FWA device 120, when a connection to a new PGW 240 needs to be created, or during a handover procedure (e.g., when the particular FWA device 120 needs to switch to a different SGW 230).

PCRF device 260 may implement policy and charging rules functions, such as establishing QoS requirements, setting allowed bandwidth and/or data throughput limits for particular bearers and/or FWA devices 120, determining charges for a particular service for a FWA device 120, and/or other types of policy or charging rules. PCRF device 260 may communicate with PGW 240 through a Gx interface 262. Gx interface 262 may be implemented, for example, using Diameter protocol.

HSS 270 may store subscription information associated with FWA devices 120 and/or information associated with users of FWA devices 120. For example, HSS 270 may store subscription profiles that include authentication, access, and/or authorization information. Each subscription profile may include information identifying FWA device 120, authentication and/or authorization information for FWA device 120, services enabled and/or authorized for FWA device 120, device group membership information for FWA device 120, and/or other types of information associated with FWA device 120. HSS 270 may communicate with MME 250 through an S6a interface 272. S6a interface 272 may be implemented, for example, using a Diameter protocol. HSS 270 may communicate with PCRF device 260 using an S6t interface 274 and with PGW 240 using an S6b interface 276.

Although FIG. 2 shows exemplary components of wireless access network 140, in other implementations, wireless access network 140 may include fewer components, different components, differently arranged components, or additional components than depicted in FIG. 2. Additionally, or alternatively, one or more components of wireless access network 140 may perform functions described as being performed by one or more other components of wireless access network 140.

Figure 3:
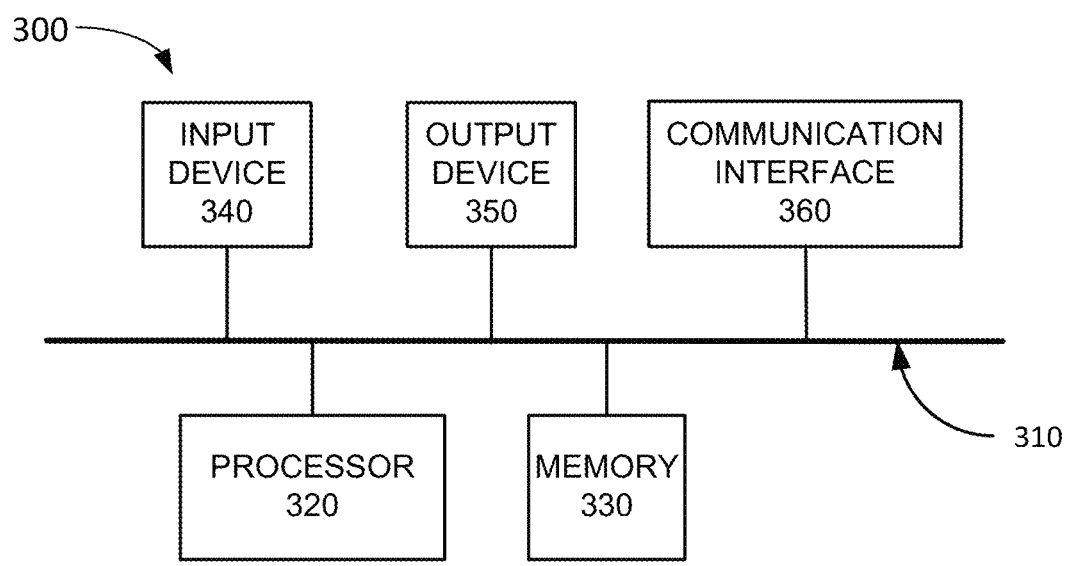
FIG. 3 is a diagram illustrating exemplary components of a device that may be included in a device of FIG. 1 and/or FIG. 2.

FIG. 3 is a diagram illustrating example components of a device 300 according to an implementation described herein. FWA device 120, CPE controller 130, WiFi AP 132, client device 134, SIM OTA system 180, FWA device system 190, eNodeB 210, gNodeB 220, SGW 230, PGW 240, MME 250, PCRF device 260, and/or HSS 270 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to the determination of signal strength for a 5G wireless signal. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hard-wired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
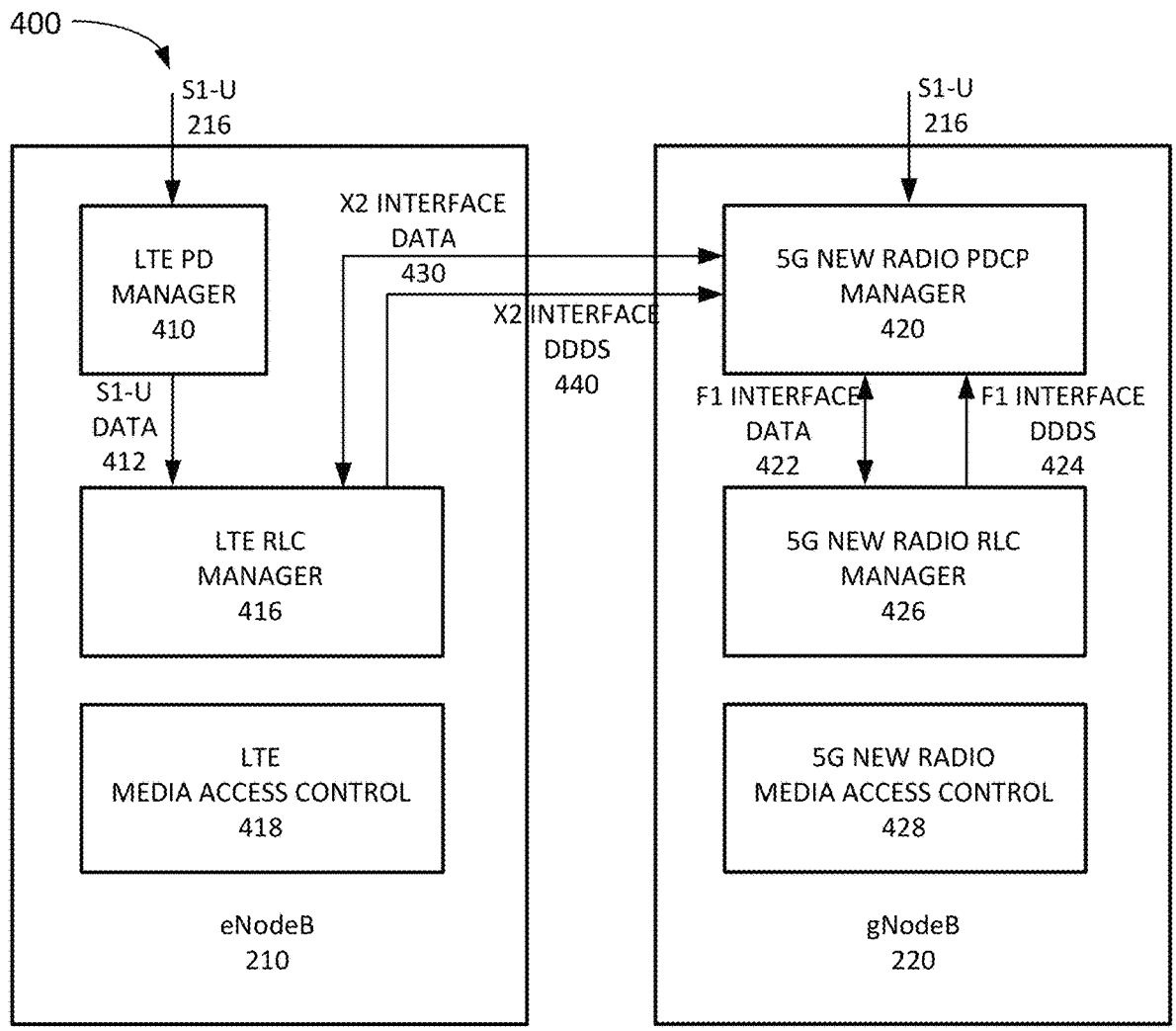
FIG. 4 is a diagram illustrating exemplary functional components of the eNodeB and gNodeB of FIG. 2.

FIG. 4 is a diagram illustrating exemplary functional components of eNodeB 210 and gNodeB 220. The functional components of eNodeB 210 and gNodeB 220 may be implemented, for example, via processor 320 executing instructions from memory 330. Alternatively, some or all of the functional components included in eNodeB 210 and/or gNodeB 220 may be implemented via hard-wired circuitry. As shown in FIG. 4, eNodeB 210 may include an LTE packet data convergence protocol (PDCP) manager 410, an LTE Radio Link Control (RLC) manager 416, and an LTE media access control (MAC) 418 layer, and gNodeB 220 may include a 5G NR PDCP manager 420, a 5G NR RLC manager 426, and a 5G NR MAC 428 layer.

LTE PDCP manager 410 may manage data traffic for data packets to and from FWA device 120 via eNodeB 210. LTE RLC manager 416 may manage Layer 2 processes associated with the 4G LTE air interface, such as sending acknowledgement messages, error correction through automatic repeat requests (ARQs), error detection and recovery, packet re-ordering and re-assembly, and/or other RLC processes. LTE MAC 418 may manage MAC processes associated with eNodeB 210.

5G NR PDCP manager 420 may manage data traffic for data packets to and from FWA device 120 via gNodeB 220. 5G NR PDCP manager 420 may determine whether to send or receive packets via a 5G NR air interface, via a 4G LTE air interface, or via both the 5G NR air interface and the 4G LTE air interface. If 5G NR PDCP manager 420 decides to use a 5G NR air interface, 5G NR PDCP manager 420 may send F1 interface data 422 to 5G NR RLC manager 426 and may receive F1 interface downlink data delivery status (DDDS) information 424 from 5G NR RLC manager 426, and/or may receive uplink data via the F1 interface. If 5G NR PDCP manager 420 decides to use a 4G LTE air interface, 5G NR PDCP manager 420 may send X2 interface data 430 to 4G LTE RLC manager 416 and may receive X2 interface DDDS information 440 from LTE RLC manager 416, and/or may receive uplink data via the X2 interface.

5G NR RLC manager 426 may manage Layer 2 associated with the 5G NR air interface, such as sending acknowledgement messages, error correction through ARQs, error detection and recovery, and/or other RLC processes. 5G NR MAC 428 may manage MAC processes associated with eNodeB 210.

Although FIG. 4 shows exemplary components of eNodeB 210 and gNodeB 220, in other implementations, eNodeB 210 and/or gNodeB 220 may include fewer components, different components, additional components, or differently arranged components than depicted in FIG. 4. Additionally, or alternatively, one or more components of eNodeB 210 and/or gNodeB 220 may perform one or more tasks described as being performed by one or more other components of eNodeB 210 and/or gNodeB 220.

Figure 5:
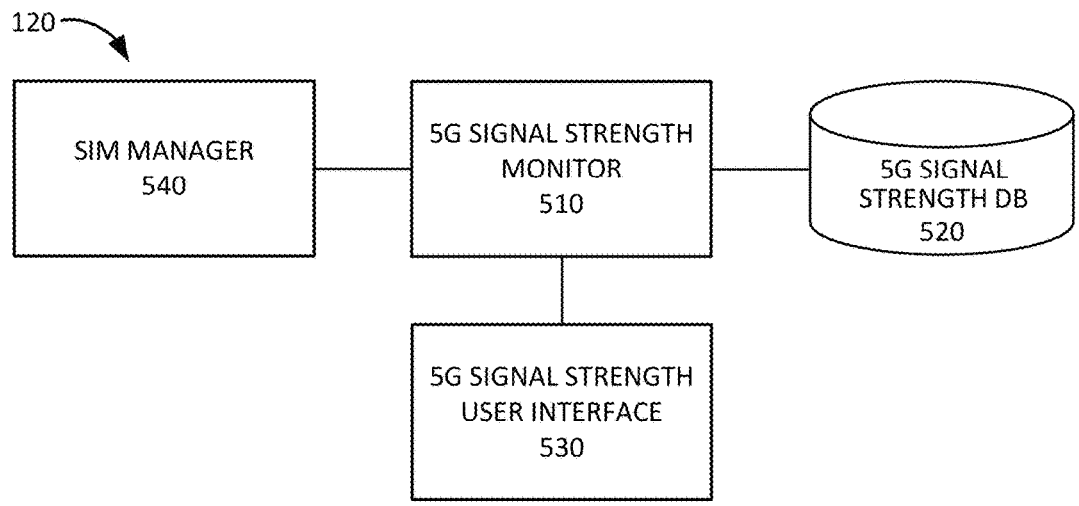
FIG. 5 is a diagram illustrating exemplary functional components of the fixed wireless access device of FIG. 1.

FIG. 5 is a diagram illustrating exemplary functional components of FWA device 120. The functional components of FWA device 120 may be implemented, for example, via processor 320 executing instructions from memory 330. Alternatively, some or all of the functional components included in FWA device 120 may be implemented via hard-wired circuitry. As shown in FIG. 5, FWA device 120 may include a 5G signal strength monitor 510, a 5G signal strength database (DB) 520, a 5G signal strength user interface 530, and a SIM manager 540.

5G signal strength monitor 510 may monitor the signal strength of a 5G wireless signal associated with a provider that is also associated with FWA device 120. For example, in response to a scan mode being activated by a user, 5G signal strength monitor 510 may identify 5G wireless signals associated with a provider that is also associated with FWA device 120. In some implementations, 5G signal strength monitor 510 may retrieve a 5G operator ID from 5G signal strength DB 520. In other implementations, 5G signal strength monitor 510 may obtain information relating to one or more parameters of a 5G synchronization signal, which may enable 5G signal strength monitor 510 to locate and identify the 5G synchronization signal when scanning for 5G signals. In yet other implementations, 5G signal strength monitor 510 may cause eNodeB 210 to add gNodeB 220 as a secondary node base station for FWA device 120; and scan for 5G wireless signals associated with gNodeB 220.

In some implementations, 5G signal strength monitor 510 may cause eNodeB 210 to add gNodeB 220 as a secondary node by causing wireless access network 140 to detect FWA device 120 as a FWA device type. As an example, 5G signal strength monitor 510 may transmit an FWA ID in an attach request to eNodeB 210. As another example, 5G signal strength monitor 510 may send a different type of ID, such as a SPID, an IMEI, an IMSI, and/or another type of ID, to cause wireless access network 140 to detect a FWA device type based on information stored in a subscriber profile associated with FWA device 120. As yet another example, 5G signal strength monitor 510 may request a particular APN, ARP, QCI, and/or another type of connection to cause wireless access network 140 to detect a FWA device type. As yet another example, FWA device 120 may inform wireless access network 140 of its FWA device type status during a UE capability transfer procedure. In response, 5G signal strength monitor 510 may receive, from eNodeB 210, a reconfiguration message, which indicates that gNodeB 220 has been added as the secondary node, and which includes information to enable 5G signal strength monitor 510 to identify 5G signals from gNodeB 220, such as information identifying a synchronization signal associated with gNodeB 220.

In other implementations, 5G signal strength monitor 510 may cause eNodeB 210 to add gNodeB 220 as a secondary node by requesting a high data rate traffic connection via a bearer established with eNodeB 210. 5G signal strength monitor 510 may receive, from eNodeB 210, a reconfiguration message, which indicates that gNodeB 220 has been added as the secondary node, and which includes information to enable 5G signal strength monitor 510 to identify 5G signals from gNodeB 220, such as information identifying a synchronization signal associated with gNodeB 220.

5G signal strength DB 520 may store an operator ID associated with gNodeB. Furthermore, 5G signal strength DB 520 may store records of signal strengths determined for 5G wireless signals at particular times. In some implementations, 5G signal strength DB 520 may store indications of 5G signal strength over a time period and/or for different locations at which FWA device 120 is installed. The location of FWA device 120 may be determined by, for example, a GPS technique, a base station multilateration technique, a WiFi positioning system technique, and/or another technique.

5G signal strength user interface 530 may display or generate data indicating determined 5G signal strengths. Additionally, or alternatively, 5G signal strength user interface 530 may be configured to interface with another device, such as a smart phone configured to communicate with FWA device 120. The smart phone may include an FWA device application (e.g., downloaded from FWA device system 190) that displays the data indicating 5G signal strengths or the data indicating how the 5G signal strength has varied over a time period and/or at different locations where FWA device 120 has been placed or installed. Furthermore, the user may activate the 5G scanning mode via 5G signal strength user interface 530 (e.g., using a button included on FWA device 120 and/or using the FWA device application running on another device). Moreover, in some implementations, 5G signal strength user interface 530 may be configured to obtain information relating to the parameters of a 5G synchronization signal from the FWA device application, which the FWA device application obtained from FWA device system 190.

SIM manager 540 may manage a SIM card associated with FWA device 120. For example, SIM manager 540 may receive updates for the SIM card from SIM OTA system 180. A SIM update may include information relating to the parameters of a 5G synchronization signal, and/or other types of information relating to gNodeB 220, and SIM manager 540 may be configured to detect the information in a SIM update and may, in response, provide the detected information to 5G signal strength monitor 510. For example, SIM OTA system 180 may set a flag in the SIM update to indicate that the SIM update includes information relating to gNodeB 220.

Although FIG. 5 shows exemplary components of FWA device 120, in other implementations, FWA device 120 may include fewer components, different components, additional components, or differently arranged components than depicted in FIG. 5. Additionally, or alternatively, one or more components of FWA device 120 may perform one or more tasks described as being performed by one or more other components of FWA device 120.

Figure 6:
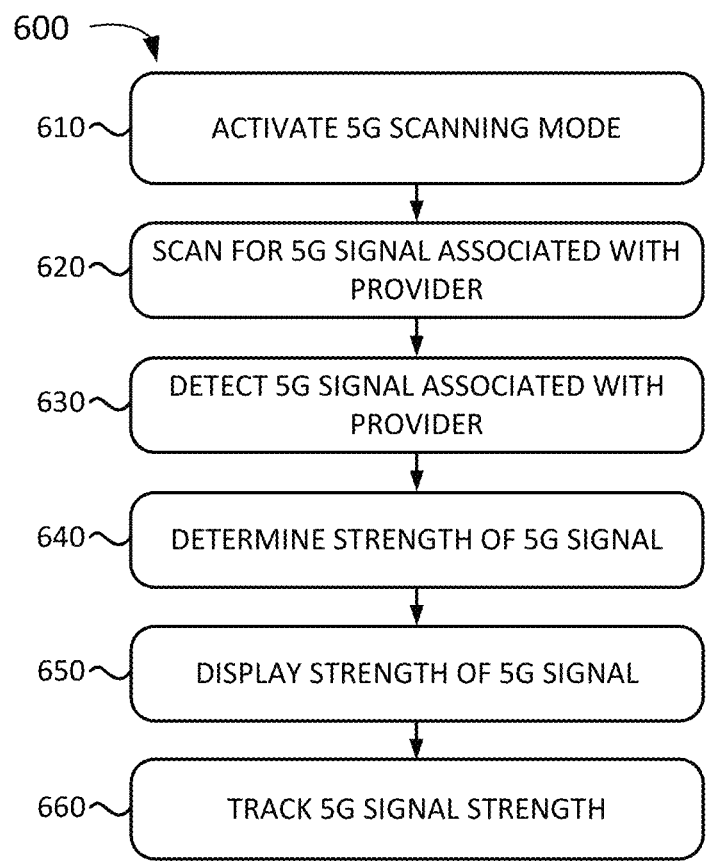
FIG. 6 is a flowchart of a process for obtaining the signal strength associated with a Fifth Generation wireless signal according to an implementation described herein.

FIG. 6 is a flowchart 600 of a process for obtaining the signal strength associated with a 5G wireless signal according to an implementation described herein. In some implementations, the process of FIG. 6 may be performed by FWA device 120. In other implementations, some or all of the process of FIG. 6 may be performed by another device or a group of devices separate from FWA device 120.

The process of flowchart 600 may include activating a 5G scanning mode (block 610). As an example, a user may activate a 5G scanning mode by pressing a button, switch, and/or another activation device included on the housing of FWA device 120. As another example, the user may activate a 5G scanning mode using an FWA device application installed on a smart phone, or another client device 134, in communication with FWA device 120.

A scan may be performed for a 5G wireless signal associated with the provider (block 620). In some implementations, 5G signal strength monitor 510 may retrieve a 5G operator ID from 5G base stations DB 520 and may scan for 5G wireless signals that include the retrieved 5G operator ID. For example, the 5G operator ID may include a Tracking Area Identifier (TAI). The TAI may include a PLMN ID and a Tracking Area Code (TAC). A PLMN ID may include a Mobile Country Code (MCC) and a Mobile Network Code (MNC). A tracking area code may identify a particular tracking area. In other implementations, as described below with reference to FIGS. 7A and 7B, 5G signal strength monitor 510 may cause eNodeB 210 to add gNodeB 220 as a secondary node base station for FWA device 120 and scan for 5G wireless signals associated with gNodeB 220, or to cause eNodeB 210 to request an event B1 measurement without having to add gNodeB 220 as the secondary node base station.

In yet other implementations, FWA device 120 may obtain information relating to the parameters of a 5G synchronization signal, such as a 5G NR SSB, that is being broadcast by gNodeB 220. The parameters may include, for example, the frequency range at which the 5G synchronization signal is being broadcast, such as a carrier frequency, a 5G band and/or channel, etc. Furthermore, the parameters may include information relating to the timing and/or spacing of the 5G NR SSB, such as a timing configuration and/or a subcarrier spacing (SCS) of the 5G NR SSB. The frequency information may enable FWA device 120 to identify at what frequencies to scan for the 5G signal, rather than having to scan across a potentially large frequency range. Furthermore, the timing and/or spacing information may enable FWA device 120 to identify the 5G NR SSB. Thus, providing the 5G NR SSB information to FWA device 120 may conserve the resource of FWA device 120 and significantly speed up the scanning process.

In some implementations, the information relating to the parameters of the 5G synchronization signal may be stored on FWA device 120 or on the SIM included with FWA device 120 before FWA device 120 is provided to the customer. In other implementations, the information relating to the parameters of the 5G synchronization signal may be obtained from FWA device system 190 via SIM OTA system 180 during a SIM update. In yet other implementations, the information relating to the parameters of the 5G synchronization signal may be obtained from FWA device system 190 by an FWA device application running on client device 134 and provided to FWA device 120.

A 5G signal associated with a provider may be detected (block 630) and the strength of the 5G signal may be determined (block 640). As an example, 5G signal strength monitor 510 may identify a 5G SSB associated with the provider and may determine the signal strength based on the identified 5G SSB. The signal strength may be based on, for example, by a channel quality indicator (CQI) value, signal to noise ratio (SNR) value, a signal-to-interference-plus-noise ratio (SINR) value, a block error rate (BLER) value, a Received Signal Strength Indication (RSSI) value, a Reference Signal Received Quality (RSRQ) value, a Reference Signal Received Power (RSRP) value, and/or other types of radio signal strength or quality parameters.

The strength of the 5G signal may be displayed (block 650). As an example, 5G signal strength user interface 530 may generate an indication of determined 5G signal strength to be displayed on a display of FWA device 120. As another example, 5G signal strength user interface 530 may generate the indication of determined 5G signal strength and send the indication to another device in CPE network 110 to be displayed to the user.

The 5G signal strength may be tracked (block 660). As an example, 5G signal strength monitor 510 may record the signal strengths for the detected 5G wireless signal over a time period and generate data indicating the signal strengths for the detected 5G wireless signal varies over the time period. The data a may be displayed on the user interface. As another example, 5G signal strength monitor 510 may record the signal strengths for the detected 5G wireless signal at different locations for FWA device 120 and generate data indicating how the signal strengths for the detected 5G wireless signal vary over the different locations. The data may be displayed via the user interface.

Figure 7A:
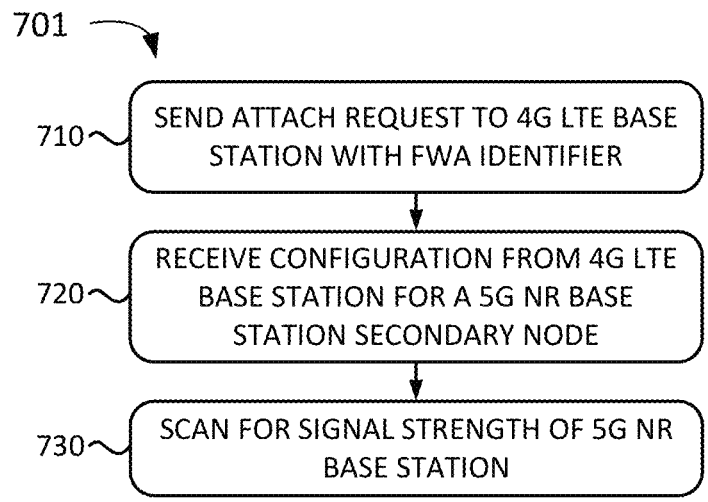
FIG. 7A is a flowchart of a first process for scanning for a Fifth Generation wireless signal according to implementations described herein.

FIG. 7A is a flowchart 701 of a first process for scanning for a 5G wireless signal according to implementations described herein. In some implementations, the process of FIG. 7A may be performed by FWA device 120. In other implementations, some or all of the process of FIG. 7A may be performed by another device or a group of devices separate from FWA device 120.

The process of flowchart 701 may include sending an attach request with an included FWA ID to a 4G LTE base station (block 710). For example, FWA device 120 may send an attach request to eNodeB 210. The attach request may include an FWA ID that identifies the attach request as being associated with a 5G scan mode of FWA device 120.

A configuration may be received from the 4G LTE base station for a 5G NR base station secondary node (block 720) and scanning for signal strength of the 5G NR base station may be performed (block 730). After eNodeB 210 has established gNodeB 220 as a secondary node, eNodeB 210 my send a reconfiguration message to FWA device 120. The reconfiguration message may inform FWA device 120 that gNodeB 220 has been added as a secondary node and that FWA device 120 may now communicate with gNodeB 220 via 5G wireless signals. The reconfiguration message may include one or more parameters of a 5G synchronization signal, such as a carrier frequency, subcarrier spacing, timing configuration, and/or other types of parameters, which enables FWA device 120 to identify, and determine the strength of, the 5G synchronization signal.

In some implementations, eNodeB 210 may not add gNodeB 220 as a secondary node to the attachment of FWA device 120. Rather, in response to receiving an attach request with the FWA ID, and completing the attach procedure, eNodeB 210 may send a reconfiguration message to FWA device 120 that includes an instruction to perform a B1 event measurement. Furthermore, in some implementation, eNodeB 210 may request a B1 event measurement for all UE devices that attach to eNodeB 210. A B1 event corresponds to an inter RAT neighbor becoming better than a threshold and the B1 event measurement of 5G signal strength is used to determine whether the 5G signal strength is high enough to trigger a measurement report. The measurement object in the reconfiguration message may specify the one or more parameters of the 5G synchronization signal. Thus, the B1 event measurement may enable FWA device 120 to determine the strength of the 5G signals from gNodeB 220 without eNodeB 210 having to add gNodeB 220 as a secondary node, which may conserve the resources of wireless access network 140.

Figure 7B:
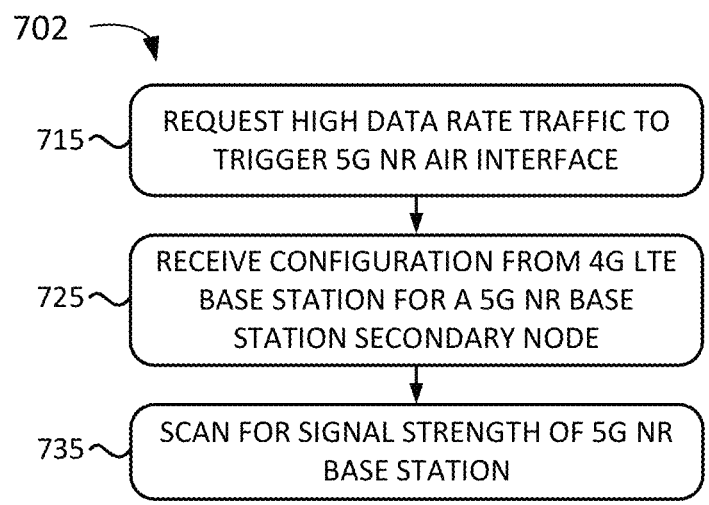
FIG. 7B is a flowchart of a second process for scanning for a Fifth Generation wireless signal according to implementations described herein.

FIG. 7B is a flowchart 702 of a second process for scanning for a 5G wireless signal according to implementations described herein. In some implementations, the process of FIG. 7B may be performed by FWA device 120. In other implementations, some or all of the process of FIG. 7B may be performed by another device or a group of devices separate from FWA device 120.

The process of flowchart 702 may include requesting high data rate traffic to trigger a 5G NR air interface (block 715). For example, FWA device 120 may perform an attach process to attach to eNodeB 210. After the attach process has been completed, FWA device 120 may request high data rate traffic using a bearer established between FWA device 120 and PGW 240 to packet data network 170, such as, for example, a video file stream from a particular server device. eNodeB 210 may detect a large data throughput for the bearer associated with FWA device 120 as a result of the streaming video file and may, in response, trigger the addition of a 5G secondary node to the attachment associated with FWA device 120.

A configuration may be received from the 4G LTE base station for a 5G NR base station secondary node (block 725) and scanning for signal strength of the 5G NR base station may be performed (block 735). After eNodeB 210 has established gNodeB 220 as a secondary node, eNodeB 210 my send a reconfiguration message to FWA device 120. The reconfiguration message may inform FWA device 120 that gNodeB 220 has been added as a secondary node and that FWA device 120 may now communicate with gNodeB 220 via 5G wireless signals. The reconfiguration message may include one or more parameters of a 5G synchronization signal, such as a carrier frequency, subcarrier spacing, timing configuration, and/or other types of parameters, which enables FWA device 120 to identify, and determine the strength of, the 5G synchronization signal.

Figure 8:
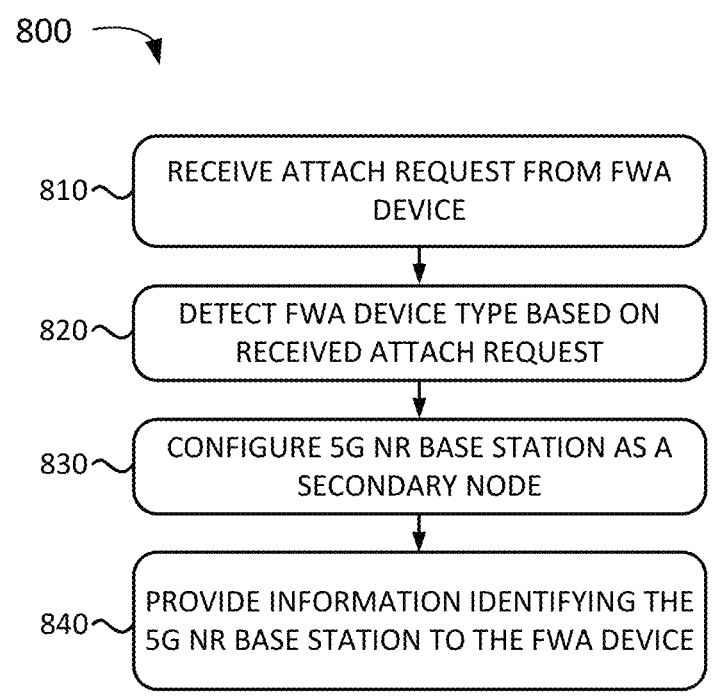
FIG. 8 is a flowchart of a process for enabling a fixed wireless access device to scan for a Fifth Generation wireless signal according to implementations described herein.

FIG. 8 is a flowchart 800 of a process for enabling FWA device 120 to scan for a 5G wireless signal according to implementations described herein. In some implementations, the process of FIG. 8 may be performed by eNodeB 210. In other implementations, some or all of the process of FIG. 8 may be performed by another device or a group of devices in wireless access network 140, such as, for example, MME 250 and/or HSS 270.

The process of flowchart 800 may include receiving an attach request from FWA device 120 (block 810), detecting an FWA device type based on the received attach request (block 820), configuring a 5G NR base station as a secondary node (block 830), and providing information identifying the 5G NR base station to FWA device 120 (block 840). As an example, eNodeB 210 may receive an attach request from FWA device 120, may detect an FWA ID in the received attach request, may send a secondary node add request to gNodeB 220 to add gNodeB 220 for the attachment associated with FWA device 120. eNodeB 210 may send a reconfiguration request that includes information identifying gNodeB 210 to FWA device 120. An example of such information includes information identifying one or more parameters of a 5G synchronization signal being broadcast by gNodeB 220.

As another example, eNodeB 210 may receive an attach request from FWA device 120 and may forward the attach request to MME 250. MME 250 may detect an FWA ID in the received attach request, and may, in response, send an instruction to eNodeB 210 to add gNodeB 220 as a secondary node for FWA device 210. In response, eNodeB 210 may send a secondary node add request to gNodeB 220 to add gNodeB 220 to the attachment associated with FWA device 120, and may send a reconfiguration request to FWA device 120 that includes information identifying one or more parameters of a 5G synchronization signal being broadcast by gNodeB 220.

As yet another example, eNodeB 210 may receive an attach request from FWA device 120 and may forward the attach request to MME 250. MME 250 may send an authentication request to HSS 270 and may include the FWA ID in the authentication request. HSS 270 may detect the FWA ID and may verify in a subscription record associated with FWA device 120 that FWA device 120 is a fixed wireless access device. In response, HSS 270 may generate an authentication answer that includes an FWA priority indication. The FWA priority indication may instruct eNodeB 210 to activate option 3x for FWA device 120. MME 250 may forward the FWA priority indication in an attach accept message to eNodeB 210 after authenticating FWA device 120. In response, eNodeB 210 may send a secondary node add request to gNodeB 220 to add gNodeB 220 to the attachment associated with FWA device 120, and may send a reconfiguration request to FWA device 120 that includes information identifying gNodeB 210, such as information identifying one or more parameters of a 5G synchronization signal being broadcast by gNodeB 220.

As explained above, in some implementations, rather than adding gNodeB 220 as a secondary node, eNodeB 210 may request that FWA device 120 perform B1 event measurement for 5G signals associated with gNodeB 220. To that end, eNodeB 210 may send a reconfiguration message to FWA device 120 with a measurement object. The measurement object may specify the parameters of the 5G synchronization signal being broadcast by gNodeB 220, enabling FWA device 120 to locate and identify the 5G synchronization signal.

Furthermore, as explained above, in other implementations, eNodeB 210, MME 250, HSS 270, and/or another component of wireless access network 140, may detect a FWA device type for FWA device 120 without FWA device 120 sending an FWA ID in an attach request. As an example, HSS 270 may detect an FWA device type based on an ID associated with FWA device 120, such as a SPID, an IMEI, an IMSI, and/or another type of device ID or subscription type. HSS 270 may identify a subscriber profile associated with FWA device 120 and may detect an indication in the subscriber profile that FWA device 120 is associated with an FWA device type. As another example, MME 250 may detect an FWA device type based on a type of connection request, such as a request for a particular APN, ARP bearer, QCI bearer, and/or another type of connection and may determine that the particular connection request is only made by FWA devices. As yet another example, FWA device 120 may inform wireless access network 140 of its FWA device type status during a UE capability transfer procedure.

Figure 9:
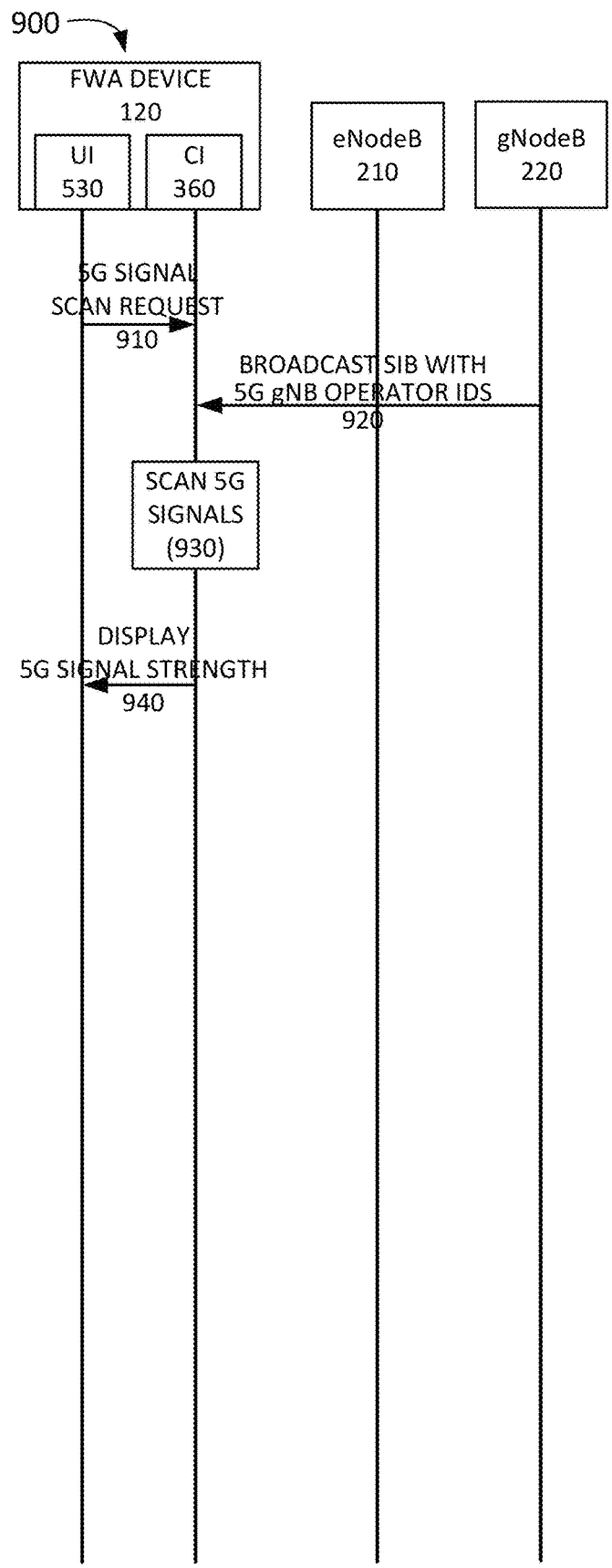
FIG. 9 illustrates a first exemplary signal flow for obtaining the signal strength associated with a Fifth Generation wireless signal according to an implementation described herein.

FIG. 9 illustrates a first exemplary signal flow 900 for obtaining the signal strength associated with a 5G wireless signal according to an implementation described herein. Signal flow 900 illustrates an implementation in which gNodeB 220 is configured to broadcast a SIB that includes a 5G operator ID. Signal flow 900 may include a user activating a 5G signal scan mode via user interface (UI) 530 (signal 910). As an example, the user may press a scan button located on the housing of FWA device 120. As another example, the client may use an application, installed on a smart phone coupled to FWA device 120 as one of client devices 134-A to 134-N, to activate the 5G signal scan mode.

gNodeB 220 may broadcast wireless signals, at particular intervals, which include a SIB that includes one or more 5G operator IDs (signal 920). In response to the activation of the 5G scan mode, communication interface (CI) 360 may retrieve one or more 5G operator IDs from 5G base stations DB 520 and may scan (block 930) for a SIB that includes the retrieved 5G one or more 5G operator IDs being broadcast by gNodeB 220. FWA device 120 may detect the 5G wireless signals, determine the signal strength of the detected 5G wireless signals, and display an indication of the determined signal strength of the 5G wireless signals to the user via user interface 530 (signal 940).

Figure 10:
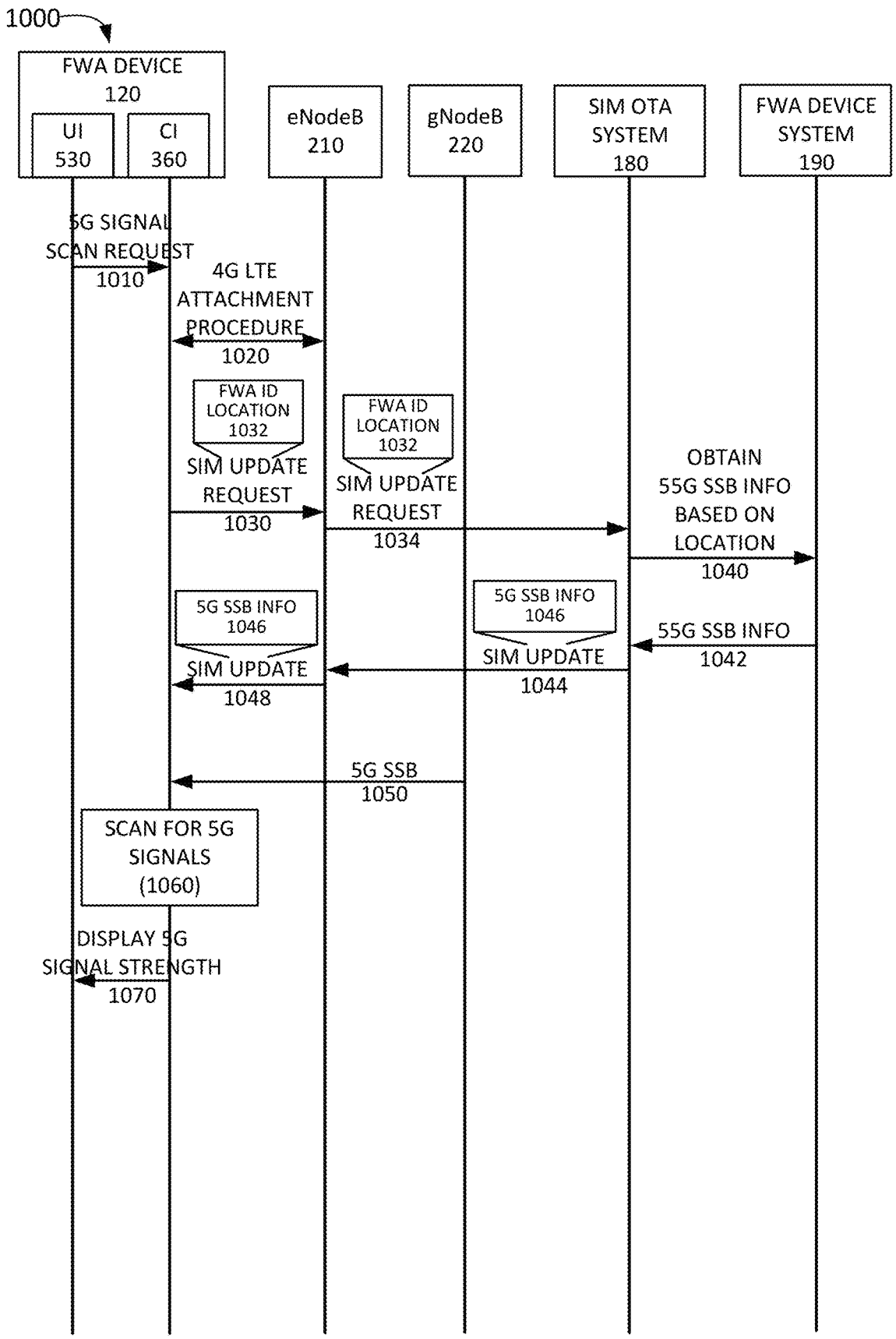
FIG. 10 illustrates a second exemplary signal flow for obtaining the signal strength associated with a Fifth Generation wireless signal according to an implementation described herein.

FIG. 10 illustrates a second exemplary signal flow 1000 for obtaining the signal strength associated with a 5G wireless signal according to an implementation described herein. Signal flow 1000 illustrates an implementation in which FWA device 120 obtains information relating to the parameters of a 5G synchronization signal, enabling FWA device 120 to locate and identify the 5G synchronization signal in order to determine the signal strength of the 5G synchronization signal.

Signal flow 1000 may include a user activating a 5G signal scan mode via user interface 530 (signal 1010). As an example, the user may press a scan button located on the housing of FWA device 120. As another example, the client may use an application, installed on a smart phone coupled to FWA device 120 as one of client devices 134-A to 134-N, to activate the 5G signal scan mode.

In response, communication interface 360 of FWA device 120 may initiate an attachment procedure to attach to eNodeB 210 (signal 1020). After the attachment procedure is completed, FWA device 120 may use the attached connection to eNodeB 210 to request a SIM update from SIM OTA 180 (signals 1030 and 1034). The SIM request may include an indication 1032 that includes an FWA ID that identifies the SIM request as originating from FWA device 120 and information identifying the location of FWA device 120. SIM OTA 180 may receive the SIM request and may detect FWA ID included in the SIM request.

In response, SIM OTA 180 may request SSB information from FWA device system 190 based on the location of FWA device 120 (signal 1040) and FWA device system 190 may provide the requested SSB information (signal 1042). The SSB information may include parameters for the SSB broadcast by gNodeB 220, such as, for example, a carrier frequency, subcarrier spacing, timing configuration, and/or other types of parameters, that enable FWA device 120 to locate and identify the 5G NR SSB broadcast by gNodeB 220.

SIM OTA system 180 may generate the requested SIM update, include the obtained 5G SSB information 1046 in the SIM update, and send the SIM update to FWA device 120 via eNodeB 210 (signals 1044 and 1048). FWA device 120 may use the obtained 5G SSB information to locate and identify the SSB being broadcast by gNodeB 220 (signal 1050 and block 1060). Thus, FWA device 120 may detect the 5G wireless signals, determine the strength of the detected 5G wireless signals, and display an indication of the determined signal strength of the 5G wireless signals to the user via user interface 530 (signal 1070).

While signal flow 1000 illustrates an implementation in which the 5G SSB information is obtained during a SIM update, in other implementations, the 5G SBB information may be obtained by FWA device 120 using a different technique. As an example, the 5G SSB information may be stored on the SIM, or a storage device or memory included in FWA device 120, before FWA device 120 is provided to the customer. As another example, the customer may download and install an FWA device application from FWA device system 190 onto a particular client device 134 that is connected to FWA device 120 (e.g., via a WiFi connection). The FWA device application may obtain the 5G SSB information from FWA device system 190 and provide the 5G SSB information to FWA device 120.

Figure 11:
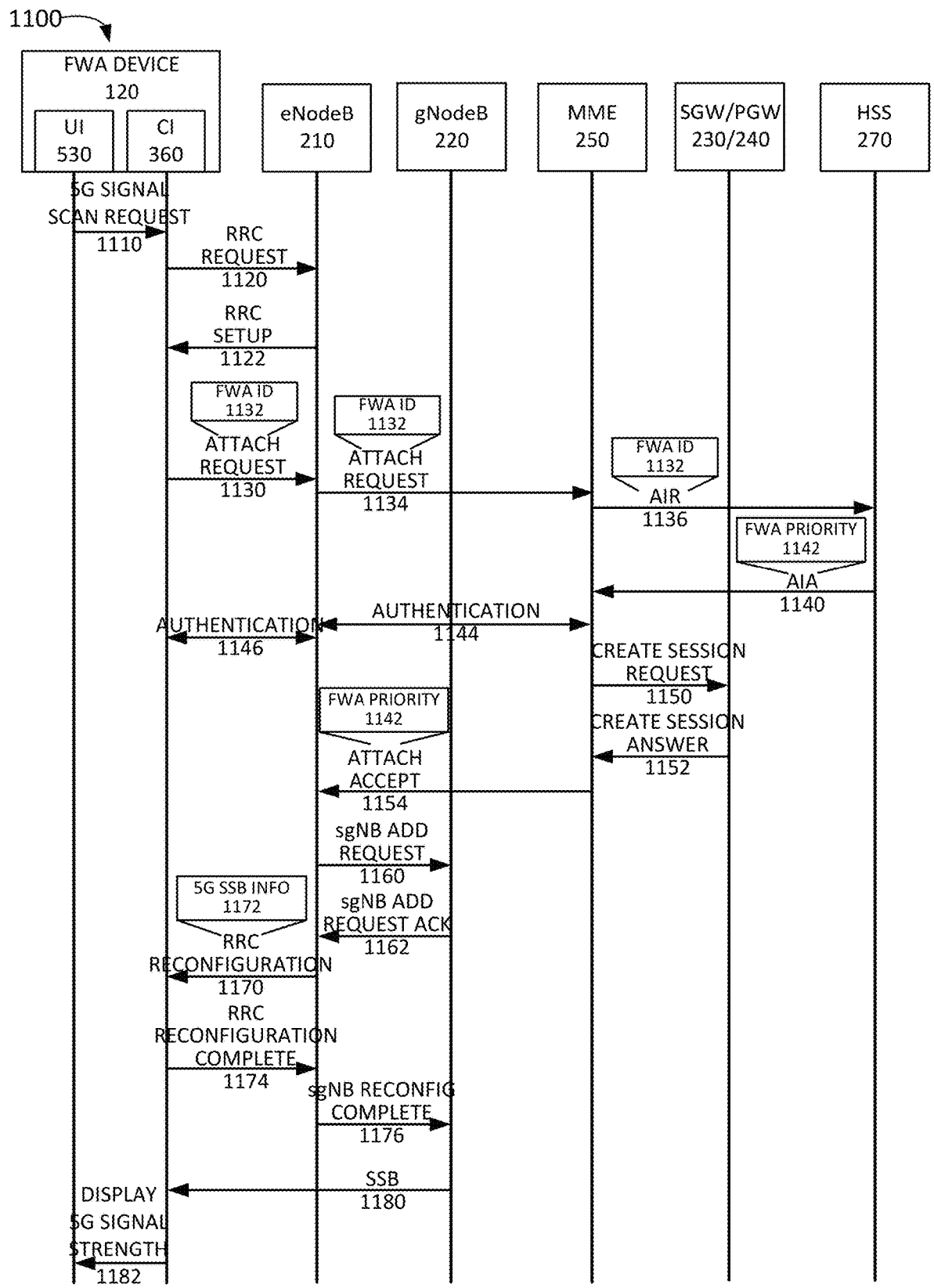
FIG. 11 illustrates a third exemplary signal flow for obtaining the signal strength associated with a Fifth Generation wireless signal according to an implementation described herein.

FIG. 11 illustrates a third exemplary signal flow 1100 for obtaining the signal strength associated with a 5G wireless signal according to an implementation described herein. Signal flow 1100 illustrates an implementation in which FWA device 120 triggers the addition of a secondary node gNodeB 220 to an attachment to eNodeB 210 via an FWA ID sent in an attach request.

Signal flow 1100 may include a user activating a 5G signal scan mode via user interface 530 (signal 1110). As an example, the user may press a scan button located on the housing of FWA device 120. As another example, the client may use an application, installed on a smart phone coupled to FWA device 120 as one of client devices 134-A to 134-N, to activate the 5G signal scan mode.

In response, communication interface 360 of FWA device 120 may initiate an attachment procedure to attach to eNodeB 210 by sending a Radio Resource Control (RRC) request to eNodeB 210 (signal 1120) and eNodeB 210 may respond with an RRC setup message (signal 1122) to establish a 4G LTE air interface link with FWA device 120. FWA device 120 may then send an attach request to eNodeB 210 (signal 1130). The attach request may include an FWA ID 1132 that identifies the attach request as being associated with a FWA device type. eNodeB 210 may forward the attach request, with FWA ID 1132, to MME 250 (signal 1134).

MME 250 may send an Authentication Information Request (AIR) to HSS 270 (signal 1136). The AIR may include FWA ID 1132. HSS 270 may identify a subscriber profile associated with FWA device 120 based on information included in the AIR. HSS 270 may respond with an Authentication Information Answer (AIA) that includes authentication information for FWA device 120 (signal 1140). Furthermore, HSS 270 may detect that the AIR includes FWA ID 1132 and may, in response, include an FWA priority indication 1142 in the AIA. FWA priority indication 1142 may instruct eNodeB 210 to activate option 3× for FWA device 120. MME 250 may receive the AIA and perform authentication with FWA device 120 (signals 1144 and 1146). Furthermore, MME 250 may send a create session request to SGW 230 and/or PGW 240 (signal 1150) and SGW 230 and/or PGW 240 may respond with create session answer (signal 1152).

MME 250 may, after receiving the create session answer, send an attach accept message back to eNodeB 210 (signal 1154). The attach accept message may include FWA priority indication 1142. In response to receiving FWA priority indication 1142, eNodeB 210 may activate gNodeB 220 as a secondary node by sending a secondary gNodeB (sgNB) add request to gNodeB 220 (signal 1160). gNodeB 220 may respond by sending a request acknowledgement (ACK) message back to eNodeB 210 (signal 1162).

eNodeB 210 may then send an RRC reconfiguration message to FWA device 120 (signal 1170). The RRC reconfiguration message may inform FWA device 120 that gNodeB 220 has been added as a secondary node and that FWA device 120 may now communicate with gNodeB 220 via 5G wireless signals. The RRC reconfiguration message may include 5G SSB information 1172, such as, for example, a carrier frequency, subcarrier spacing, timing configuration, and/or other types of parameters, that enable FWA device 120 to locate and identify the 5G NR SSB broadcast by gNodeB 220. 5G SSB information may be obtained by eNodeB 210 from gNodeB 220 in the request ACK message. Additionally, or alternatively, eNodeB 210 may maintain a DB of 5G SSB information for gNodeB 220. FWA device 120 may respond back to eNodeB 210 with an RRC reconfiguration complete message (signal 1174). eNodeB may then inform gNodeB 220 that the RRC reconfiguration is compete by sending an sgNB reconfiguration complete message to gNodeB 220 (signal 1176).

FWA device 120 may use the obtained 5G SSB information to locate and identify the SSB being broadcast by gNodeB 220 (signal 1180). Thus, FWA device 120 may detect the 5G wireless signals, determine the strength of the detected 5G wireless signals, and display an indication of the determined signal strength of the 5G wireless signals to the user via user interface 530 (signal 1182).

Figure 12:
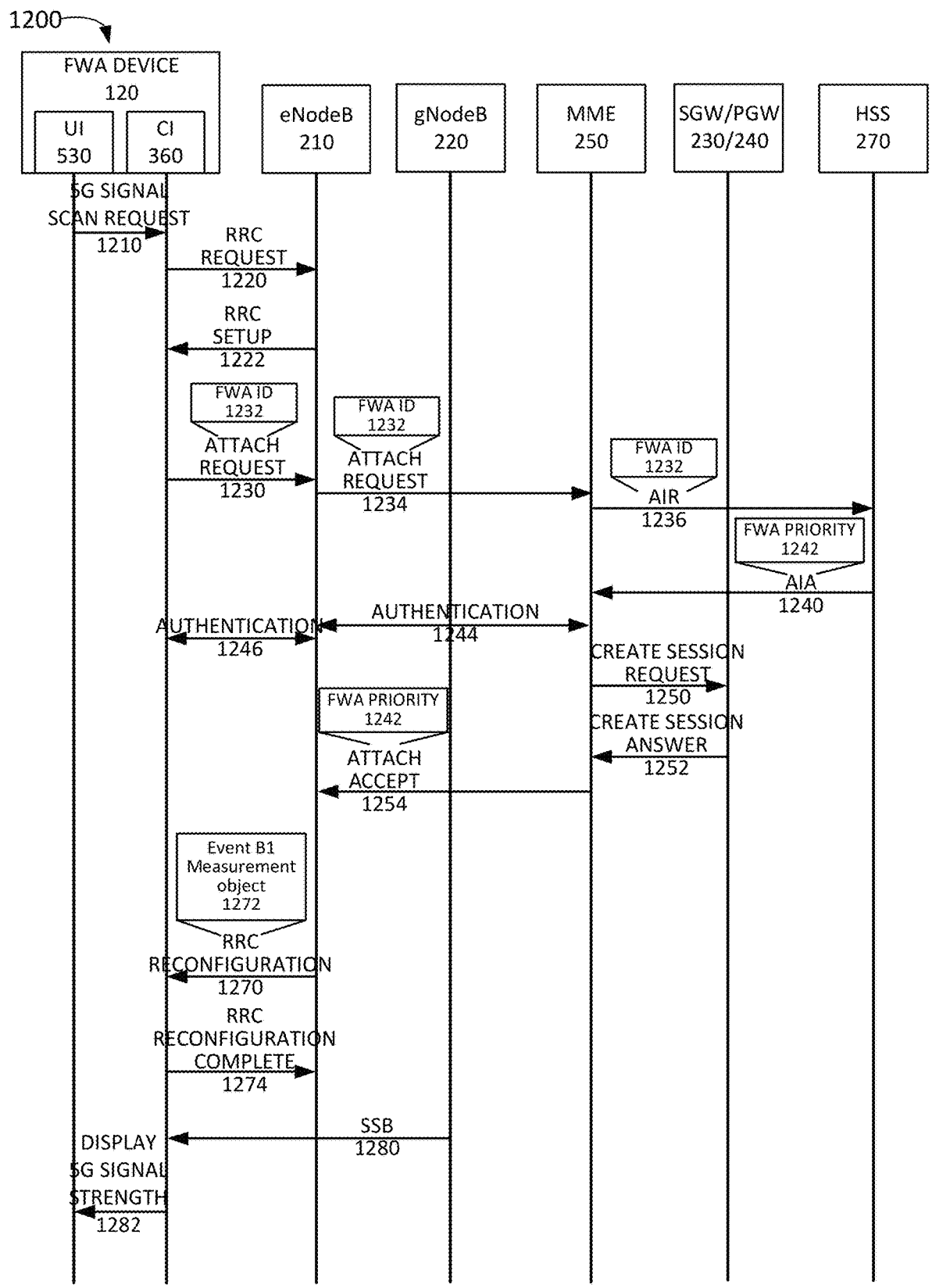
FIG. 12 illustrates a fourth exemplary signal flow for obtaining the signal strength associated with a Fifth Generation wireless signal according to an implementation described herein.

FIG. 12 illustrates a fourth exemplary signal flow 1200 for obtaining the signal strength associated with a 5G wireless signal according to an implementation described herein. Signal flow 1200 illustrates an implementation in which FWA device 120 sends an attach request to eNodeB 210 with an FWA ID, which causes eNodeB 210 to request a B1 event measurement to be performed by FWA device 120.

Signal flow 1200 may include a user activating a 5G signal scan mode via user interface 530 (signal 1210). As an example, the user may press a scan button located on the housing of FWA device 120. As another example, the client may use an application, installed on a smart phone coupled to FWA device 120 as one of client devices 134-A to 134-N, to activate the 5G signal scan mode.

In response, communication interface 360 of FWA device 120 may initiate an attachment procedure to attach to eNodeB 210 by sending an RRC request to eNodeB 210 (signal 1220) and eNodeB 210 may respond with an RRC setup message (signal 1222) to establish a 4G LTE air interface link with FWA device 120. FWA device 120 may then send an attach request to eNodeB 210 (signal 1230). The attach request may include an FWA ID 1232 that identifies the attach request as being associated with a FWA device type. eNodeB 210 may forward the attach request, with FWA ID 1232, to MME 250 (signal 1234).

MME 250 may send an Authentication Information Request (AIR) to HSS 270 (signal 1236). The AIR may include FWA ID 1232. HSS 270 may identify a subscriber profile associated with FWA device 120 based on information included in the AIR. HSS 270 may respond with an Authentication Information Answer (AIA) that includes authentication information for FWA device 120 (signal 1240). Furthermore, HSS 270 may detect that the AIR includes FWA ID 1232 and may, in response, include an FWA priority indication 1242 in the AIA. FWA priority indication 1242 may instruct eNodeB 210 to activate option 3× for FWA device 120. MME 250 may receive the AIA and perform authentication with FWA device 120 (signals 1244 and 1246). Furthermore, MME 250 may send a create session request to SGW 230 and/or PGW 240 (signal 1250) and SGW 230 and/or PGW 240 may respond with create session answer (signal 1252).

MME 250 may, after receiving the create session answer, send an attach accept message back to eNodeB 210 (signal 1254). The attach accept message may include FWA priority indication 1242. In response to receiving FWA priority indication 1242, eNodeB 210 may select to instruct FWA device 120 to perform a B1 event measurement. eNodeB 210 may send an RRC reconfiguration message to FWA device 120 (signal 1270) that includes a measurement object 1272 for the B1 event measurement. The measurement object in the reconfiguration message may specify 5G SSB information, such as, for example, a carrier frequency, subcarrier spacing, timing configuration, and/or other types of parameters, that enable FWA device 120 to locate and identify the 5G NR SSB broadcast by gNodeB 220. 5G SSB information may be obtained by eNodeB 210 from gNodeB 220 in the request ACK message. Additionally, or alternatively, eNodeB 210 may maintain a DB of 5G SSB information for gNodeB 220. FWA device 120 may respond back to eNodeB 210 with an RRC reconfiguration complete message (signal 1274).

FWA device 120 may use the obtained 5G SSB information to locate and identify the SSB being broadcast by gNodeB 220 (signal 1280). Thus, FWA device 120 may detect the 5G wireless signals, determine the strength of the detected 5G wireless signals, and display an indication of the determined signal strength of the 5G wireless signals to the user via user interface 530 (signal 1282).

Figure 13:
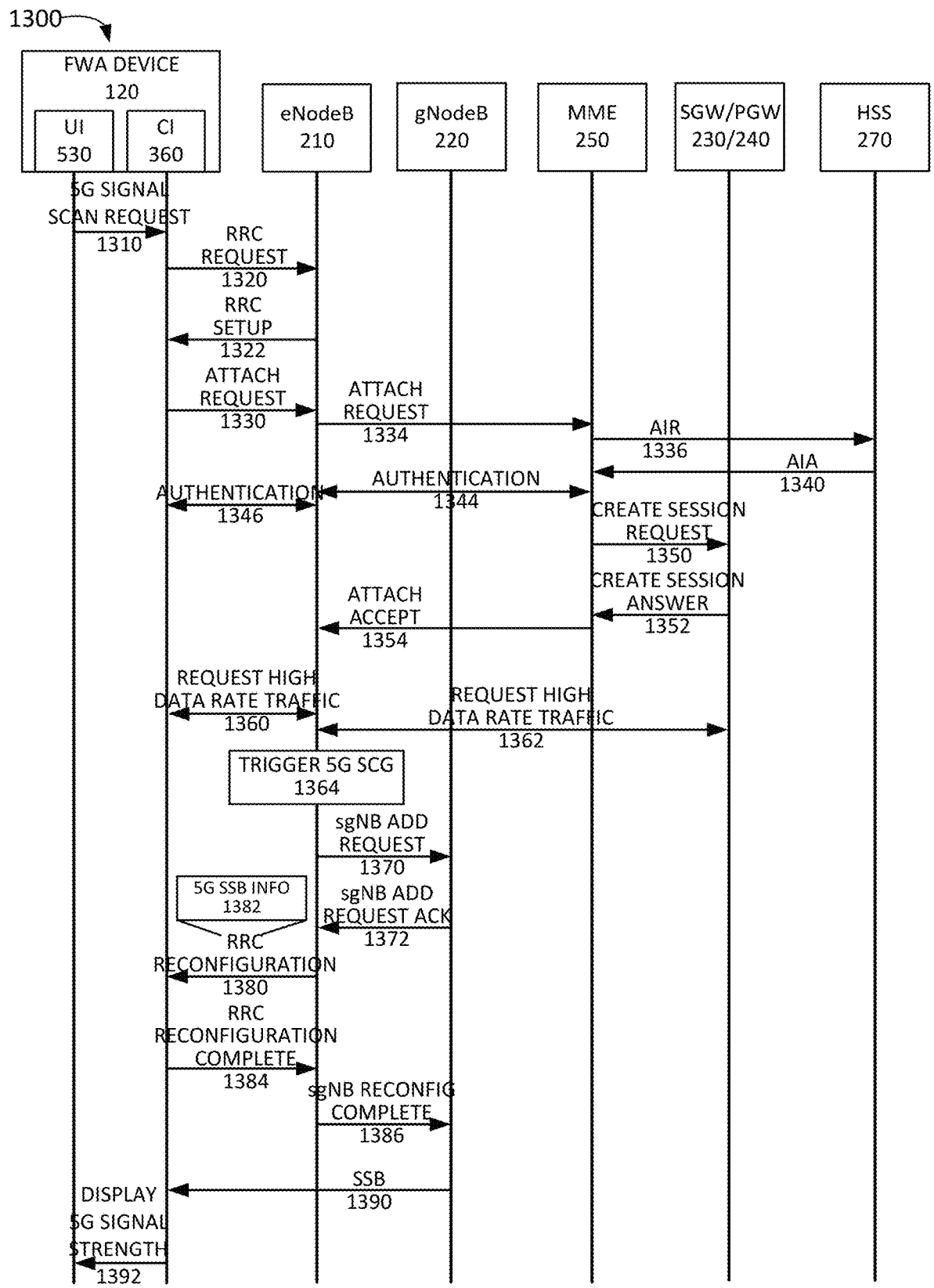
FIG. 13 illustrates a fifth exemplary signal flow for obtaining the signal strength associated with a Fifth Generation wireless signal according to an implementation described herein.

FIG. 13 illustrates a third exemplary signal flow 1300 for obtaining the signal strength associated with a 5G wireless signal according to an implementation described herein. Signal flow 1300 illustrates an implementation in which FWA device 120 triggers the addition of a secondary node gNodeB 220 to an attachment to eNodeB 210 by requesting a high data rate connection.

Signal flow 1300 may include a user activating a 5G signal scan mode via user interface 530 (signal 1310). As an example, the user may press a scan button located on the housing of FWA device 120. As another example, the client may use an application, installed on a smart phone coupled to FWA device 120 as one of client devices 134-A to 134-N, to activate the 5G signal scan mode.

In response, communication interface 360 of FWA device 120 may initiate an attachment procedure to attach to eNodeB 210 by sending an RRC request to eNodeB 210 (signal 1320) and eNodeB 210 may respond with an RRC setup message (signal 1322) to establish a 4G LTE air interface link with FWA device 120. FWA device 120 may then send an attach request to eNodeB 210 (signal 1330). eNodeB 210 may forward the attach request, with FWA ID 1032, to MME 250 (signal 1334).

MME 250 may send an AIR to HSS 270 (signal 1336). HSS 270 may identify a subscriber profile associated with FWA device 120 based on information included in the AIR. HSS 270 may respond with an AIA that includes authentication information for FWA device 120 (signal 1340). MME 250 may receive the AIA and perform authentication with FWA device 120 (signals 1344 and 1346). Furthermore, MME 250 may send a create session request to SGW 230 and/or PGW 240 (signal 1350) and SGW 230 and/or PGW 240 may respond with create session answer (signal 1352). MME 250 may, after receiving the create session answer, send an attach accept message back to eNodeB 210 (signal 1354).

After the attach process has been completed, FWA device 120 may request high data rate traffic using a bearer established between FWA device 120 and PGW 240 to packet data network 170 (signal flows 1360 and 1362). For example, FWA device 120 may request to perform a speed test by requesting a particular file used for testing download speeds, request to stream a video file from a particular server device, etc. eNodeB 210 may detect a large data throughput for the bearer associated with FWA device 120 as a result of the streaming video file and may, in response, trigger the addition of a 5G secondary node to the attachment associated with FWA device 120 (block 1064). eNodeB 120 may send a secondary gNodeB add request to gNodeB 220 (signal 1370). gNodeB 220 may respond by sending a request acknowledgement (ACK) message back to eNodeB 210 (signal 1372).

eNodeB 210 may then send an RRC reconfiguration message to FWA device 120 (signal 1380). The RRC reconfiguration message may inform FWA device 120 that gNodeB 220 has been added as a secondary node and that FWA device 120 may now communicate with gNodeB 220 via 5G wireless signals. The RRC reconfiguration message may include 5G SSB information 1382, such as, for example, a carrier frequency, subcarrier spacing, timing configuration, and/or other types of parameters, that enable FWA device 120 to locate and identify the 5G NR SSB broadcast by gNodeB 220. 5G SSB information may be obtained by eNodeB 210 from gNodeB 220 in the request ACK message. Additionally, or alternatively, eNodeB 210 may maintain a DB of 5G SSB information for gNodeB 220. FWA device 120 may respond back to eNodeB 210 with an RRC reconfiguration complete message (signal 1384). eNodeB may then inform gNodeB 220 that the RRC reconfiguration is complete by sending an sgNB reconfiguration complete message to gNodeB 220 (signal 1386).

FWA device 120 may use the obtained 5G SSB information to locate and identify the SSB being broadcast by gNodeB 220 (signal 1390). Thus, FWA device 120 may detect the 5G wireless signals, determine the strength of the detected 5G wireless signals, and display an indication of the determined signal strength of the 5G wireless signals to the user via user interface 530 (signal 1392).

Figure 14A:
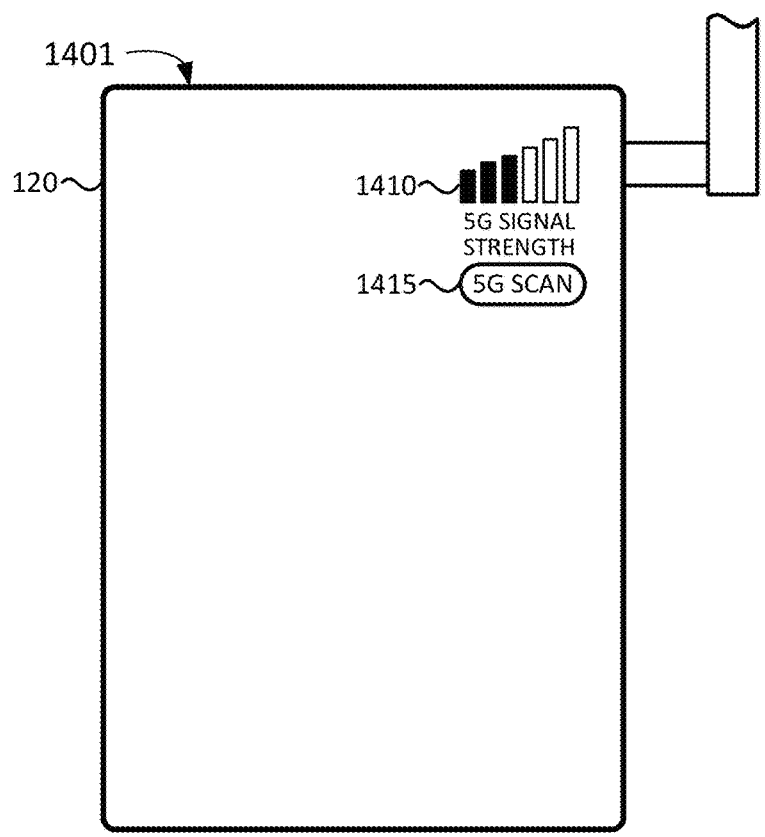
FIG. 14A is a diagram of a first exemplary user interface according to an implementation described herein.

FIG. 14A is a diagram of a first exemplary user interface 1401 according to an implementation described herein. User interface 1401 may include a display 1410 that includes a set of LEDs, and/or another type of indicator, located on the housing of FWA device 120 and a scan activator 1415, such as a hardware button, switch, and/or another type of activation object to initiate a scan for 5G wireless signals. Display 1410 may indicate the strength of a detected 5G wireless signal by the number of LEDs that are lit when a 5G scanning mode is detected in response to the user pressing scan activator 1415. Based on the 5G wireless signal strength indicated by display 1410, a user may identify an appropriate location where to install FWA device 120 so that FWA device 120 experiences high 5G signal strength.

Figure 14B:
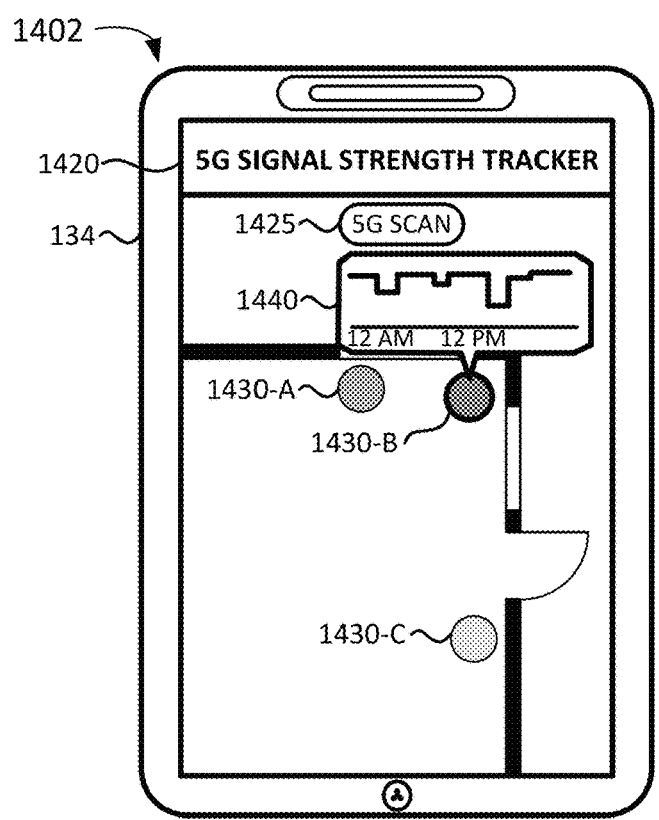
FIG. 14B is a diagram of a second exemplary user interface according to an implementation described herein.

FIG. 14B is a diagram of a second exemplary user interface 1402 according to an implementation described herein. User interface 1402 may be generated by an FWA device application installed on a user's smart phone configured as one of client devices 134-A to 134-N of FWA device 120 and/or CPE controller 130. User interface 1402 may include a scan activator 1425, such as a button and/or another selection object displayed on the touchscreen of the smart phone. Furthermore, user interface 1402 may keep track of locations where the user has placed FWA device 120 and scanned for 5G wireless signals.

For example, the FWA device application may generate a map of the user's customer premises. In some implementations, the FWA device application may be configured to enable the user to sketch or otherwise generate a layout of the customer premises. In other implementations, the user may download or select a layout of the customer premises from a database of layouts. In some implementations, the user may manually indicate a position of FWA device 120 on the layout of the customer premises each time the user moves FWA device 120 to a new location and selects to perform a scan for 5G wireless signals. In other implementations, the FWA device application may detect a location of FWA device 120, and/or client device 134 on which the FWA device application is running using one or more techniques, such as a GPS technique, a base station multilateration technique, a WiFi positioning system technique, and/or another technique.

User interface 1402 may include a position indicator icon 1430 for each location at which FWA device 120 scanned for 5G wireless signals. For example, user interface 1402 shows a first position indicator icon 1430-A, a second position indicator icon 1430-B, and a third position indicator icon 1430-C. The 5G signal strength experienced by FWA device 120 at each location may be indicated by the darkness of shading for each position indicator icon 1430, and/or using another type of attribute, such as a size of the icon, a number or tooltip displayed in connection with the icon, etc. The current location of FWA device 120 may also be indicated, such as, for example, by a stronger border around the icon (e.g., third position indicator icon 1430-C in FIG. 14B) and/or by using another type of attribute.

Moreover, user interface 1402 may keep track of the 5G signal strength over time at particular locations. For example, as shown in FIG. 14B, user interface 1402 may include a time tracking indicator 1440, associated with the current location of FWA 120, that displays the strength of 5G wireless signals over a time period, such as over the last 24-hour period, averaged over multiple 24-hour periods, and/or over another type of time period. Keeping track of the signal strength of 5G wireless signals over a time period may enable the user to determine whether a particular location experiences stable signal strength over time.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 6, 7A, 7B, and 8, and series of signal flows have been described with respect to FIGS. 9, 10, 11, 12, and 13, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

The following acronyms are used in the Figures:
FIG. 1
FWA device 120 Fixed Wireless Access device 120
CPE controller 130 Customer Premises Equipment controller 130
WiFi AP 132-A to 132-M WiFi Access Point 132-A to 132-M
SIM OTA system 180 Subscriber Identity Module Over-The-Air system 180
FWA device system 190 Fixed Wireless Access device system 190
FIG. 2
FWA device 120 Fixed Wireless Access device 120
SGW 230 Serving Gateway 230
PGW 240 Packet Data Network Gateway 240
MME 250 Mobility Management Entity 250
PCRF 260 Policy and Charging Rules Function 260
HSS 270 Home Subscriber Server 270

What is claimed is:
1. A method comprising:
  attaching, by a fixed wireless access device, to a Fourth Generation (4G) Long Term Evolution (LTE) base station;
  causing, by the fixed wireless access device, the 4G LTE base station to add a Fifth Generation (5G) New Radio (NR) base station as a secondary base station for the fixed wireless access device;
  scanning, by the fixed wireless access device, for 5G wireless signals associated with the 5G NR base station; and
  generating, by the fixed wireless access device, an indication of signal strength for the 5G wireless signals associated with the 5G NR base station.
2. The method of claim 1, wherein causing the 4G LTE base station to add the 5G NR base station as the secondary base station for the fixed wireless access device includes:
  sending an attach request to the 4G LTE base station, wherein the attach request includes an identifier that identifies the fixed wireless access device as a fixed wireless access device type.

3. The method of claim 1, wherein scanning for the 5G wireless signals associated with the 5G NR base station includes:
  receiving, from the 4G LTE base station, a reconfiguration message, wherein the reconfiguration message includes information identifying one or more parameters for a 5G synchronization signal; and
  scanning for the 5G synchronization signal based on the identified one or more parameters.

4. The method of claim 3, wherein the one or more parameters for the 5G synchronization signal include at least one of a carrier frequency, a subcarrier spacing, or a timing configuration for the 5G synchronization signal.

5. The method of claim 1, wherein scanning for 5G wireless signals includes:
  determining a 5G operator identifier associated with a provider of wireless services; and
  scanning for 5G wireless signals associated with the determined 5G operator identifier.

6. The method of claim 1, wherein scanning for 5G wireless signals includes:
  obtaining information identifying a frequency at which a 5G synchronization signal is broadcast; and
  scanning for the 5G synchronization signal at the identified frequency.

7. The method of claim 1, wherein causing the 4G LTE base station to add the 5G NR base station as the secondary base station for the fixed wireless access device includes:
  requesting high data rate traffic via a connection with the 4G LTE base station, wherein the high data rate traffic causes the 4G LTE base station to add the 5G NR base station as the secondary base station for the fixed wireless access device.

8. The method of claim 1, wherein generating the indication of the signal strength for the 5G wireless signals further includes:
  displaying the indication of the determined signal strength on an output device included on the fixed wireless access device.

9. The method of claim 1, wherein generating the indication of the signal strength for the 5G wireless signals further includes:
  sending the indication, of the determined signal strength to a client device configured to communicate with the fixed wireless access device, to be displayed by the client device.

10. The method of claim 1, further comprising:
  tracking the signal strength for the 5G wireless signals over a time period; and
  generating an indication of how the signal strength for the 5G wireless signals varies over the time period, to be displayed on a user interface associated with the fixed wireless access device.

11. The method of claim 1, further comprising:
  tracking the signal strength for the 5G wireless signals at a plurality of locations for the fixed wireless access device; and
  generating an indication of how the signal strength for the 5G wireless signals varies over the plurality of locations, to be displayed in a user interface associated with the fixed wireless access device.

12. A fixed wireless access device comprising:
  a memory configured to store instructions; and
  a processor configured to execute the instructions to:
    attach to a Fourth Generation (4G) Long Term Evolution (LTE) base station;
    cause the 4G LTE base station to add a Fifth Generation (5G) New Radio (NR) base station as a secondary base station for the fixed wireless access device;
    scan for 5G wireless signals associated with the 5G NR base station; and
    generate an indication of signal strength for the 5G wireless signals associated with the 5G NR base station.

13. The fixed wireless access device of claim 12, wherein, when causing the 4G LTE base station to add the 5G NR base station as the secondary base station for the fixed wireless access device, the processor is further configured to:
  send an attach request to the 4G LTE base station, wherein the attach request includes an identifier that identifies the fixed wireless access device as a fixed wireless access device type.

14. The fixed wireless access device of claim 12, wherein, when scanning for the 5G wireless signals associated with the 5G NR base station, the processor is further configured to:
  receive, from the 4G LTE base station, a reconfiguration message, wherein the reconfiguration message includes information identifying one or more parameters for a 5G synchronization signal; and
  scan for the 5G synchronization signal based on the identified one or more parameters.

15. The fixed wireless access device of claim 14, wherein the one or more parameters for the 5G synchronization signal include at least one of a carrier frequency, a subcarrier spacing, or a timing configuration for the 5G synchronization signal.

16. The fixed wireless access device of claim 12, wherein, when scanning for the 5G wireless signals associated with the 5G NR base station, the processor is further configured to:
  determine a 5G operator identifier associated with a provider of wireless services; and
  scan for 5G wireless signals associated with the determined 5G operator identifier.

17. The fixed wireless access device of claim 12, wherein, when scanning for the 5G wireless signals associated with the 5G NR base station, the processor is further configured to:
  obtain information identifying a frequency at which a 5G synchronization signal is broadcast; and
  scan for the 5G synchronization signal at the identified frequency.

18. The fixed wireless access device of claim 12, wherein, when causing the 4G LTE base station to add the 5G NR base station as the secondary base station for the fixed wireless access device, the processor is further configured to:
  request high data rate traffic via a connection with the 4G LTE base station, wherein the high data rate traffic causes the 4G LTE base station to add the 5G NR base station as the secondary base station for the fixed wireless access device.

19. The fixed wireless access device of claim 12, wherein the processor is further configured to:
  track the signal strength for the 5G wireless signals over a time period or at a plurality of locations for the fixed wireless access device; and
  generate an indication of how the signal strength for the 5G wireless signals varies over the time period or over the plurality of locations, to be displayed on the user interface associated with the fixed wireless access device.

20. A system comprising:
a base station configured to:
  detect a fixed wireless access device type based on an attach request message; and
  configure a 5G New Radio (NR) base station as a secondary base station for a connection associated with the attach request message based on the detected fixed wireless access device type; and
a fixed wireless access device configured to:
  send the attach request to the base station;
  cause the base station to add the 5G NR base station as the secondary base station for the fixed wireless access device;
  scan for 5G wireless signals associated with the 5G NR base station; and
  generate an indication of signal strength associated with the 5G wireless signals for the 5G NR base station.

\* \* \* \* \*